United States Patent
Stevens et al.

(10) Patent No.: US 9,449,378 B2
(45) Date of Patent: Sep. 20, 2016

(54) SYSTEM AND METHOD FOR PROCESSING STEREOSCOPIC VEHICLE INFORMATION

(75) Inventors: George B. Stevens, Cedar Park, TX (US); Robert W. Srack, Bennington, KS (US); Janet M. Srack, Bennington, KS (US); Thomas L. Srack, Bennington, KS (US); Robert D. Bailey, McPherson, KS (US); Mark A. Anzalone, Austin, TX (US)

(73) Assignee: Matrix Electronic Measuring Properties, LLC, Salina, KS (US)

( * ) Notice: Subject to any disclaimer, the term of this patent is extended or adjusted under 35 U.S.C. 154(b) by 1035 days.

(21) Appl. No.: 13/554,939

(22) Filed: Jul. 20, 2012

(65) Prior Publication Data

US 2013/0188018 A1    Jul. 25, 2013

Related U.S. Application Data

(63) Continuation-in-part of application No. 12/125,809, filed on May 22, 2008, now Pat. No. 8,249,332, and a continuation-in-part of application No. 12/125,794, filed on May 22, 2008, now Pat. No. 8,345,953, and a continuation-in-part of application No. 12/125,801, filed on May 22, 2008, now Pat. No. 8,326,022.

(51) Int. Cl.
*G06K 9/00* (2006.01)
*G06T 7/00* (2006.01)
*H04N 13/02* (2006.01)
*G06F 17/30* (2006.01)

(52) U.S. Cl.
CPC ....... *G06T 7/0004* (2013.01); *G06F 17/30244* (2013.01); *G06T 7/0075* (2013.01); *H04N 13/0203* (2013.01); *H04N 13/0246* (2013.01); *G06T 2207/10012* (2013.01); *G06T 2207/20101* (2013.01)

(58) Field of Classification Search
None
See application file for complete search history.

(56) References Cited

U.S. PATENT DOCUMENTS

| | | | |
|---|---|---|---|
| 4,329,784 A | 5/1982 | Bjork |
| 4,513,508 A | 4/1985 | Jarman |
| 4,598,481 A | 7/1986 | Donahue |
| 4,630,379 A | 12/1986 | Wickmann |
| 4,811,250 A | 3/1989 | Steber |
| 4,934,063 A | 6/1990 | Speisser |
| 4,997,283 A | 3/1991 | Danielson |

(Continued)

FOREIGN PATENT DOCUMENTS

WO    2012019877    2/2012

OTHER PUBLICATIONS

Translated Russian Office Action in Russian Application No. 2010152366 issued Jul. 17, 2012, 6 pages.

(Continued)

*Primary Examiner* — Wesley Tucker
(74) *Attorney, Agent, or Firm* — Spencer Fane LLP

(57) ABSTRACT

A stereoscopic measurement system determines relative location of a point on an object based on a stereo image pair of the object. The system comprises an image capture device for capturing a stereo image pair of the object, the image pair comprising a first image and a second image of the object. The system comprises a processing system configurable to designate a first point and a second point on the first image, designate the first point and the second point on the second image, define stereo points based on the designated points, and to calculate a distance between the stereo points.

66 Claims, 32 Drawing Sheets

(56) References Cited

U.S. PATENT DOCUMENTS

| | | |
|---|---|---|
| 5,029,397 A | 7/1991 | Palombi |
| 5,054,207 A | 10/1991 | Marshall |
| 5,125,164 A | 6/1992 | Fournier |
| 5,144,487 A | 9/1992 | Hersey |
| 5,193,288 A | 3/1993 | Stifnell |
| 5,295,073 A | 3/1994 | Celette |
| 5,335,420 A | 8/1994 | King, III |
| 5,383,454 A | 1/1995 | Buckholz |
| 5,502,898 A | 4/1996 | Manore |
| 5,515,613 A | 5/1996 | Hinson |
| 5,622,170 A | 4/1997 | Schulz |
| 5,644,854 A | 7/1997 | Bergeron |
| 5,696,705 A | 12/1997 | Zykan |
| RE35,816 E | 6/1998 | Schultz |
| 5,784,792 A | 7/1998 | Smith |
| 6,105,264 A | 8/2000 | Phillips |
| 6,115,927 A | 9/2000 | Hendrix |
| 6,165,181 A | 12/2000 | Heilbrun |
| 6,601,309 B1 | 8/2003 | Hedstrom |
| 6,977,679 B2 | 12/2005 | Tretter |
| 7,206,080 B2 | 4/2007 | Kochi |
| 2001/0010546 A1 | 8/2001 | Chen |
| 2002/0002330 A1 | 1/2002 | Vilsmeier |
| 2002/0029128 A1 | 3/2002 | Jones |
| 2002/0038084 A1 | 3/2002 | Pelzer |
| 2002/0066193 A1 | 6/2002 | Hodge |
| 2002/0087075 A1 | 7/2002 | Bucholz |
| 2002/0104390 A1 | 8/2002 | Jones |
| 2003/0090681 A1 | 5/2003 | Jones |
| 2003/0174204 A1 | 9/2003 | Otani |
| 2004/0165776 A1 | 8/2004 | Brouwer |
| 2004/0179729 A1 | 9/2004 | Imai |
| 2005/0068452 A1 | 3/2005 | Steinberg |
| 2005/0068522 A1* | 3/2005 | Dorrance ........... G01B 11/2755 356/139.09 |
| 2005/0180623 A1 | 8/2005 | Mueller |
| 2006/0082644 A1 | 4/2006 | Tsubaki |
| 2006/0152711 A1 | 7/2006 | Dale, Jr. et al. |
| 2006/0239542 A1* | 10/2006 | Corghi ............... G01B 11/2755 382/154 |
| 2006/0274302 A1* | 12/2006 | Shylanski .......... G01B 11/2755 356/139.09 |
| 2008/0024596 A1 | 1/2008 | Li |
| 2008/0186383 A1 | 8/2008 | Dorrance |
| 2009/0031782 A1 | 2/2009 | Jackson |
| 2009/0290787 A1 | 11/2009 | Stevens |
| 2010/0028949 A1 | 2/2010 | Beuger |
| 2011/0179656 A1 | 7/2011 | Rogers |
| 2011/0221867 A1* | 9/2011 | Nobis ................. G01B 11/275 348/46 |

OTHER PUBLICATIONS

International Search Report & Written Opinion dated Mar. 27, 2014, PCT/US2013/51303, 19 pgs.
International Search Report regarding PCT/US2009/044789 dated Jul. 16, 2009, 2 pgs.
International Search Report regarding PCT/US2009/044791 dated Jul. 17, 2009, 2 pgs.
International Search Report regarding PCT/US2009/044793 dated Jul. 14, 2009, 2 pgs.
Notice of Allowance in U.S. Appl. No. 12/125,809, issued Jun. 6, 2012, 18 pgs.
Office Action mailed May 23, 2012 in U.S. Appl. No. 12/125,794, 39 pgs.
Office Action mailed Jun. 5, 2012 in U.S. Appl. No. 12/125,801, filed May 22, 2008, 39 pgs.
Written Opinion regarding PCT/US2009/044789 dated Jul. 16, 2009, 8 pgs.
Written Opinion regarding PCT/US2009/044791 dated Jul. 17, 2009, 7 pgs.
Written Opinion regarding PCT/US2009/044793 dated Jul. 14, 2009, 5 pgs.
Bruhn H. et al; "Fotogrammetrische Vermessung Von Kraftfahrzeugen", ATZ automobiltechnische Zeitschrift, Springer, vol. 91, No. 6, Jun. 1, 1989, pp. 341-347; XP000082909, ISSN: 0001-2785.
Ku Guan et al; "A Feature Points matching Method for Calibration Target Images", Computer Science and Engineering, 2009, WCSE '09, Second International workshop on IEEE, Piscataway, NY, USA, Oct. 28, 2009, pp. 263-266.

* cited by examiner

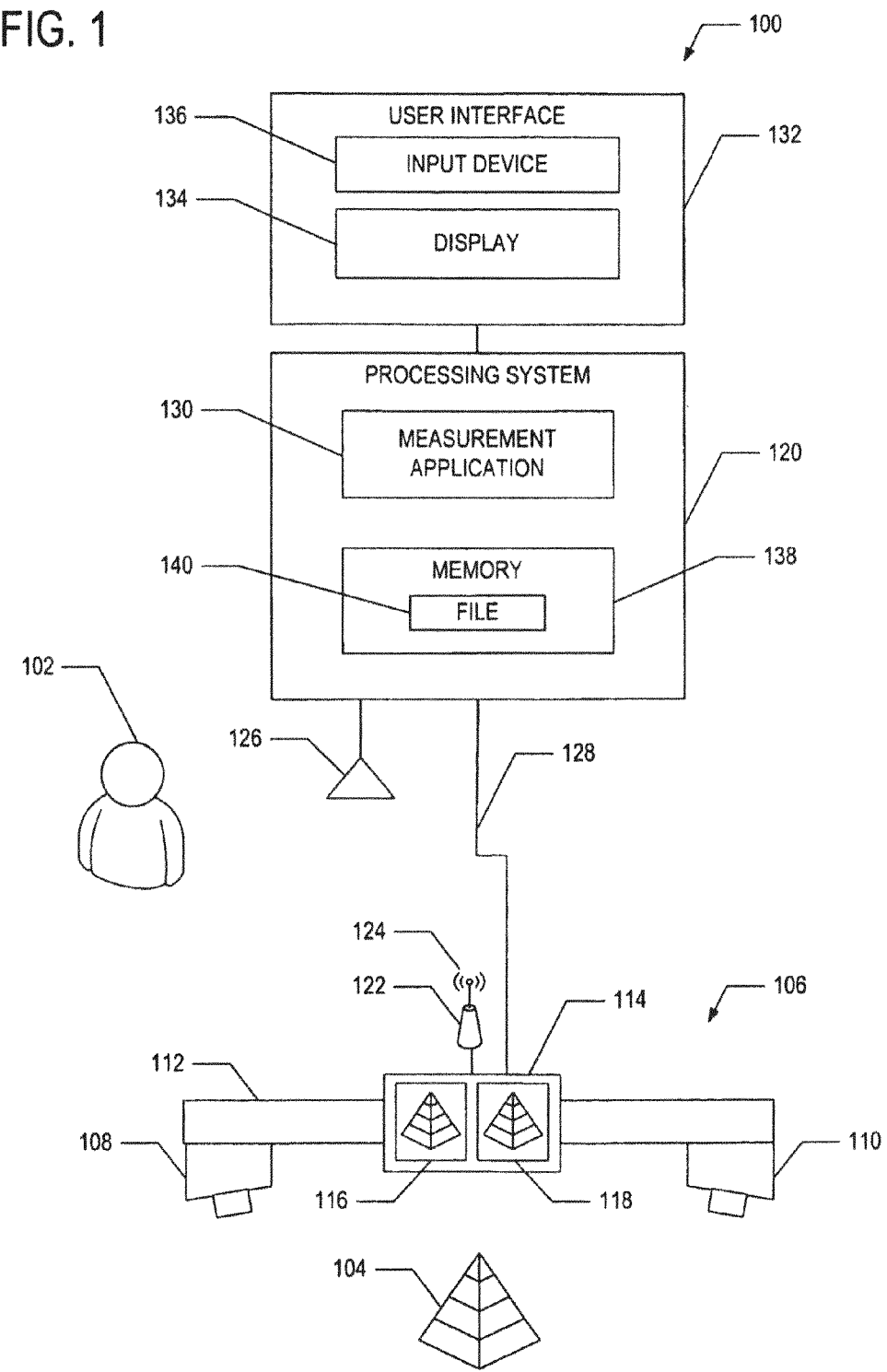

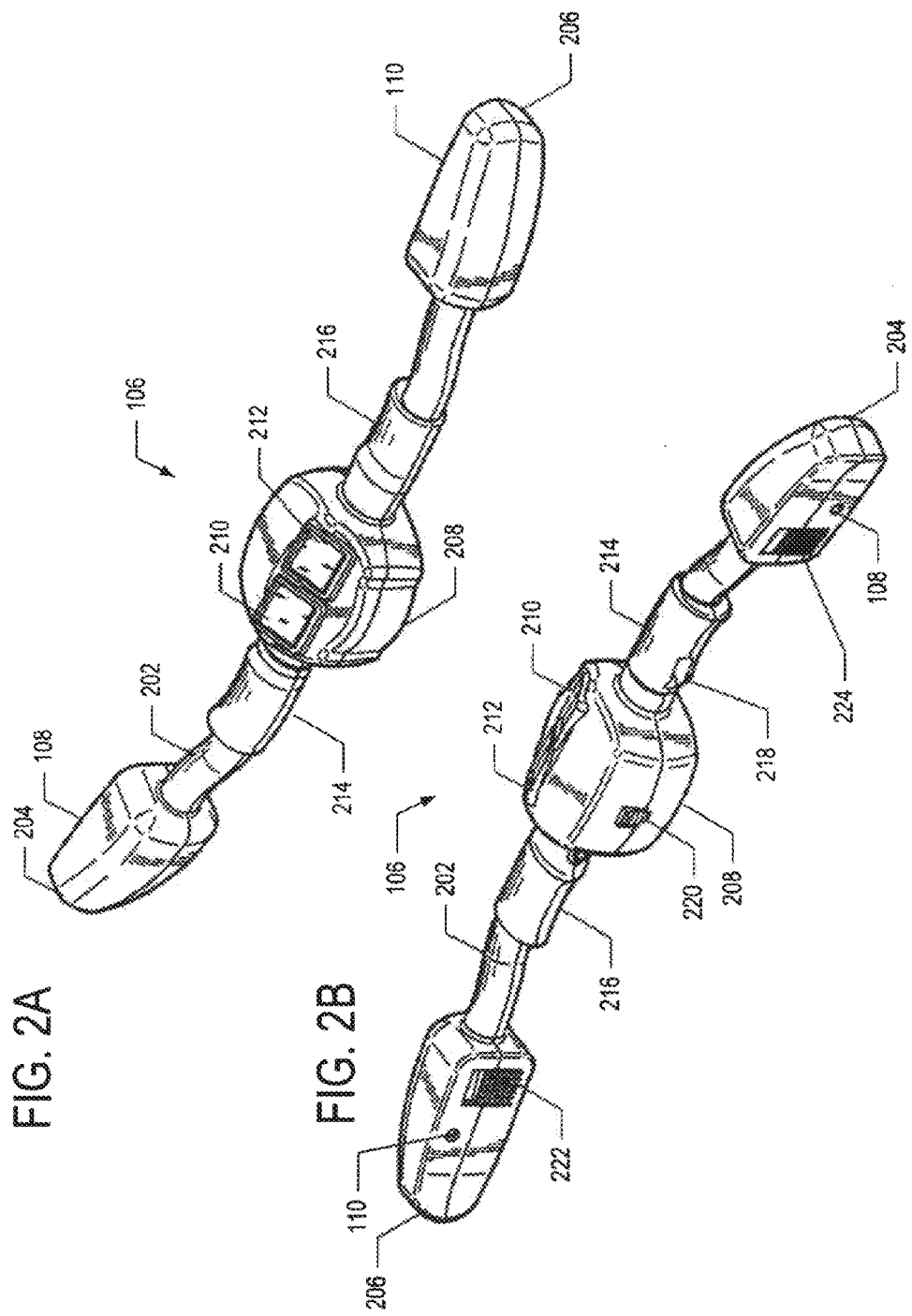

| Select Project | | | | |
|---|---|---|---|---|
| Select Project: | | | | |
| Customer Name | Measurement Date | Make | Model | Year | Bodytype |
| estimated, measures | 2006-05-11 | ACURA | 2.2CL | 1997 | COUPE |
| Camera, Optimization | 2006-05-08 | ACURA | 2.2CL | 1997 | COUPE |
| network, tester | 2005-11-08 | ACURA | 2.2CL | 1997 | COUPE |
| Johnson, Eric | 2005-11-03 | HUMMER | H2 | 2005 | SPORT UTILITY |
| new, calibration | 2005-10-20 | ACURA | 2.2CL | 1997 | COUPE |
| Johnson, Eric | 2005-10-12 | ACURA | 2.2CL | 1997 | COUPE |
| carriage version 0.9rc2, | 2005-10-11 | ACURA | 2.2CL | 1997 | COUPE |
| sdf, dsf | 2005-09-27 | ACURA | 2.2CL | 1997 | COUPE |
| 715, test | 2005-09-20 | ACURA | 2.2CL | 1997 | COUPE |
| test, serialcomm | 2005-08-30 | ACURA | 2.2CL | 1997 | COUPE |
| sdf, sadf | 2005-08-30 | ACURA | 2.2CL | 1997 | COUPE |

Ok    Cancel

Fig. 4B

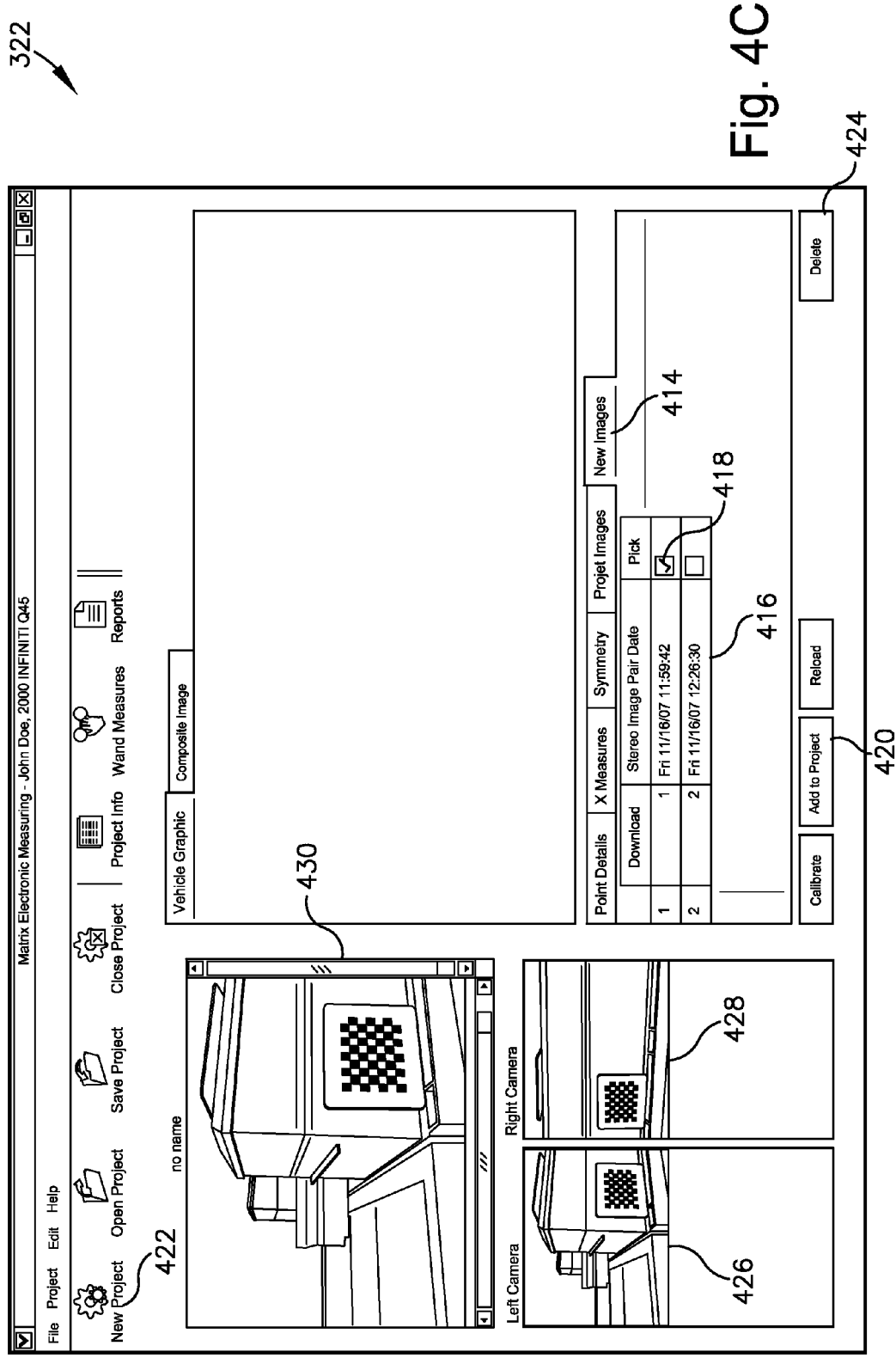

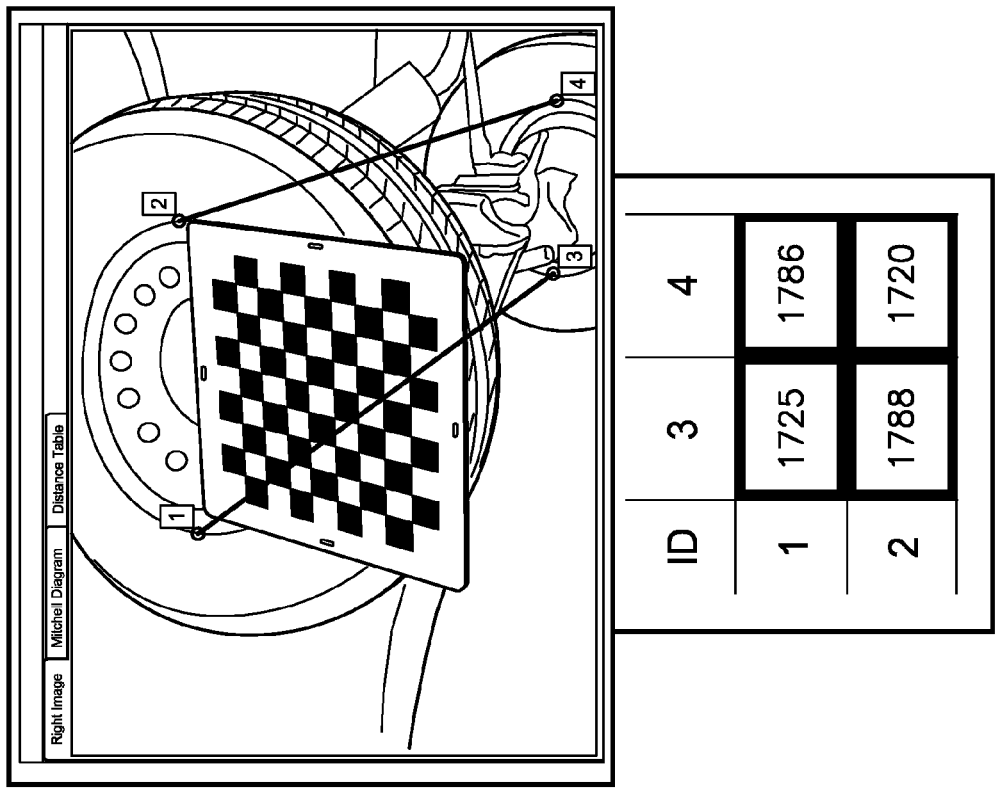
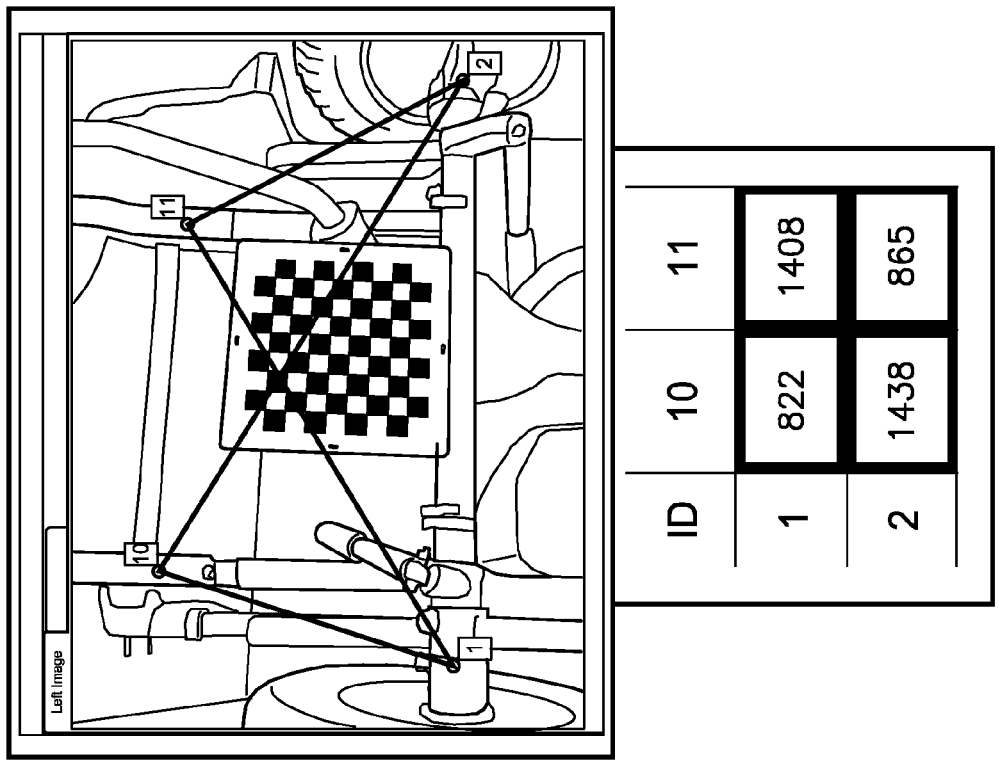
Fig. 17

SYSTEM AND METHOD FOR PROCESSING STEREOSCOPIC VEHICLE INFORMATION

RELATED APPLICATIONS

This application claims priority in and is a continuation-in-part of: U.S. patent application Ser. No. 12/125,809, entitled Stereoscopic Measurement System and Method, filed May 22, 2008, now U.S. Pat. No. 8,249,332; U.S. patent application Ser. No. 12/125,794, entitled Stereoscopic Measurement System and Method, filed May 22, 2008, now U.S. Pat. No. 8,345,953; U.S. patent application Ser. No. 12/125,801, entitled Stereoscopic Measurement System and Method, filed on May 22, 2008, now U.S. Pat. No. 8,326,022; wherein the entire content of each application is incorporated herein by reference

FEDERALLY SPONSORED RESEARCH OR DEVELOPMENT

Not Applicable.

COMPACT DISK APPENDIX

Not Applicable.

BACKGROUND OF THE INVENTION

A common task in various fields is to determine the location of a point on an object relative to another point on the object or another object. In a quality control environment, for example, the relative locations of parts of an item preferably fall within a specified tolerance. In an architectural or building inspection scenario, the foundation of a building is tracked to determine shifts in location over time. In a vehicle repair scenario, a shift in the location of a part determines whether any damage has occurred, and if so, the extent of the damage.

Stereoscopic imaging, or stereoscopy, is used to obtain three-dimensional information about an object based on a pair of two-dimensional images of that object. In general, stereoscopic imaging involves obtaining at least two images of an object, taken from slightly different viewpoints, to determine the three-dimensional information. By obtaining the two stereo images from slightly different perspectives, coordinate locations of desired measurement points identified in both images can be more accurately determined.

Stereoscopic imaging is the basis for photogrammetry, which involves producing stereograms or a pair of stereo images of an object in order to determine geometric properties and/or measurement information about the object. Photogrammetry is used in various fields, such as manufacturing, architectural surveying, building preservation, and archaeology in order to obtain measurement information for an object of interest. When obtaining measurements between particular measurement points on a desired object via photogrammetry, it is generally required that the same measurement points are designated in both images to obtain accurate measurement information.

With the advent of digital image sensors, computer-based image processing techniques have been developed and applied to photogrammetry. The increase in digital image sensor resolution and advancements in computer image-processing have not been efficiently utilized for stereoscopic measurement purposes. A stereoscopic processing system allows easier designation of measurement points in stereo images of an object to obtain more accurate measurements.

SUMMARY OF INVENTION

In the vehicle collision repair industry, a common task is to determine whether there is damage to a part, including a vehicle's structure, and if so, the extent of that damage. Another task is to document the actual damage for insurance and other purposes. In the course of repairing a vehicle's body work, one or more wheel alignments are regularly performed.

According to one aspect, a system comprising at least one processor is provided for obtaining measurements of an object. The system may be used to determine the relative location of a point on the object. In one embodiment, the system comprises a processing system, a stereo image pair, and an image capture device for simultaneously capturing a first image and a second image of an object. The processing system comprises a memory and is configurable to store a stereo image pair comprising first and second images of a particular object. In one embodiment, the processing system is further configurable to generate a list of stereo image pairs for display, to generate corresponding first and second images of a particular stereo image pair selected from the list for display. The processing system is configurable to receive a first user input designating a first measurement point in the corresponding first image, a second user input designating a second measurement point in the corresponding first image, a third user input designating the first measurement point along a selection assist line in the corresponding second image, and a fourth user input designating the second measurement point along another selection assist line in the corresponding second image. The processing system is configurable to identify a range of points in the corresponding second image based on the first measurement point designated in the corresponding first image, to generate the selection assist line in the corresponding second image based on the range of points, to identify another range of points in the corresponding second image based on the second measurement point designated in the corresponding first image, and to generate the other selection assist line in the corresponding second image based on the other range of points. The processing system is configurable to define a first stereo point that corresponds to the first measurement point designated in the corresponding first and second images and to define a second stereo point that corresponds to the second measurement point designated in the corresponding first and second images. The processing system is configurable to calculate a distance between the first stereo point and the second stereo point. In one aspect, the measurement points may be located on a test portion of the object where damage or deviation from a preferred location is suspected. In another aspect, the measurement points may be located on a reference portion of the object where it is known or believed that there is no damage or deviation. In yet another aspect, some measurement points may be located on the test portion, while other measurement points may be located on the reference portion. See FIG. 17.

According to another aspect, a system comprising at least one processor is provided for obtaining measurements from a stereo image pair of an object. The system comprises a processing system and a stereo image pair. The stereo image pair comprises first and second images of the object. The processing system comprises a memory, and is configurable to generate the first image and the second image for display and to receive a first user input designating a first measurement point in the first image and a second user input designating a second measurement point in the first image. The processing system is configurable to define a projection vector in the second image based on the first measurement point, to generate a selection assist line in the second image based on the projection vector, to identify another projection vector in the second image based on the second measurement point, to generate another selection assist line in the second image based on the other projection vector, to determine first pixel values adjacent to the first measurement point, to compare the determined first pixel values with other pixel values along the selection assist line to dynamically identify a corresponding first measurement point in the second image with adjacent other pixel values that match the determined first pixel values, to determine second pixel values adjacent to the second measurement point designated in the first image, and to compare the determined second pixel values with second other pixel values along the other selection assist line to dynamically identify a corresponding second measurement point in the second image with adjacent other pixel values that match the determined second pixel values. The processing system is configurable to define a first stereo point that corresponds to the first measurement point designated in the first image and identified in the second image and to define a second stereo point that corresponds to the second measurement point designated in the first image and identified in the second image. The processing system is configurable to calculate a distance between the first stereo point and the second stereo point. The processing system is configurable to display the distance between the first stereo point and the second stereo point.

According to another aspect, a method is provided for obtaining measurements from a stereo image pair of an object. The stereo image pair comprises first and second images of the object. The method comprises displaying the first image and the second image. The method further comprises designating a first measurement point in the first image and designating a second measurement point in the first image. The method further comprises identifying a range of points in the second image based on the first measurement point and identifying another range of points in the second image based on the second measurement point. The method further comprises generating a selection assist line in the second image based on the range of points and generating another selection assist line in the second image based on the other range of points. The method further comprises designating the first measurement point in the second image along the selection assist line and designating the second measurement point in the second image along the other selection assist line. The method further comprises defining a first stereo point that corresponds to the first measurement point designated in the first and second images and defining a second stereo point that corresponds to the second measurement point designated in the first and second images. The method also comprises calculating a distance between the first stereo point and the second stereo point.

According to another aspect, a method is provided for obtaining measurements from a stereo image of an object using at least one processor. The stereo image pair comprises first and second images of the object. The method comprises displaying the first image and the second image. The method further comprises designating a first measurement point and designating a second measurement point in the first image. An embodiment of the method also comprises receiving a user input to designate the first measurement point and receiving another user input to designate the second measurement point. The method further comprises identifying a range of points in the second image based on the first measurement point designated in the first image and identifying another range of points in the second image based on the second measurement point designated in the first image. The method further comprises generating a selection assist line in the second image based on the range of points and generating another selection assist line in the second image based on the other range of points. The method further comprises determining first pixel values adjacent to the first measurement point designated in the first image and determining second pixel values adjacent to the second measurement point designated in the first image. The method further comprises comparing the determined first pixel values with other pixel values along the selection assist line to dynamically identify a corresponding first measurement point in the second image with adjacent other pixel values that match the determined first pixel values. The method further comprises comparing the determined second pixel values with second other pixel values along the other selection assist line to dynamically identify a corresponding second measurement point in the second image with adjacent second other pixel values that match the determined second pixel values. The method further comprises defining a first stereo point that corresponds to the first measurement point designated in the first image and identified in the second image and defining a second stereo point that corresponds to the second measurement point designated in the first image and identified in the second image. The method also comprises calculating a distance between the first stereo point and the second stereo point.

According to another aspect, a system comprising modules executable with at least one processor is provided for obtaining measurements of an object. The system comprises a processing system, which comprises a memory to store a stereo image pair of the object. The stereo image pair comprises first and second images of the object. The processing system is configurable to generate the first and second images of the object for display. In one embodiment the processing system is configurable to designate a first set of points in a first stereo image pair and to designate a second set of points in a second stereo image pair, wherein the first stereo image pair comprises the first and second images of a portion of the object, and wherein the second stereo image pair comprises other first and second images of an opposite portion of the object. See FIGS. 11 and 18. In an embodiment, the processing system is configurable to receive user inputs to designate the first set of points and the second set of points. In one embodiment, the processing system is configurable to define a reference plane for the set of points in the first stereo image pair and a reference plane for the set of points in the second stereo image pair and to calculate symmetry deviations between the first set of points and the second set of points as a function of the defined reference planes, and wherein the user interface component is configured to generate the symmetry deviations for display. In one aspect, one set of points may be located on a reference portion of the object. The processing system is further configurable to calculate deviations of points from known reference coordinates as a function of the reference planes.

According to another aspect, a method is provided for obtaining measurements of an object using at least one processor. The method comprises storing a stereo image pair in a memory. The stereo image pair comprises first and second images of the object. The method further comprises displaying first and second images of the object. The method further comprises receiving a first set of user inputs designating a first set of points in a first stereo image pair and receiving a second set of user inputs designating a second set of points in a second stereo image pair, wherein the first stereo image pair comprises the first and second images of a portion of the object, and wherein the second stereo image pair comprises other first and second images of an opposite portion of the object. In one embodiment the method further comprises defining a reference plane between the first set of points in the first stereo image pair and the second set of points in the second stereo image pair. The reference plane may be a central reference plane. The method further comprises calculating symmetry deviations between the first set of points and the second set of points as a function of the defined reference plane. The method also comprises displaying the symmetry deviations.

BRIEF DESCRIPTION OF THE DRAWINGS

FIG. 1 is a block diagram of a stereoscopic measurement system in accordance with an aspect of the present invention.

FIGS. 2A and 2B are perspective views of a stereo image capture device according to an aspect of the stereoscopic measurement system.

FIGS. 4A-4F are screen views of image management forms.

FIG. 17 is an illustration of measurement points on a vehicle.

DETAILED DESCRIPTION

Figure 3A:
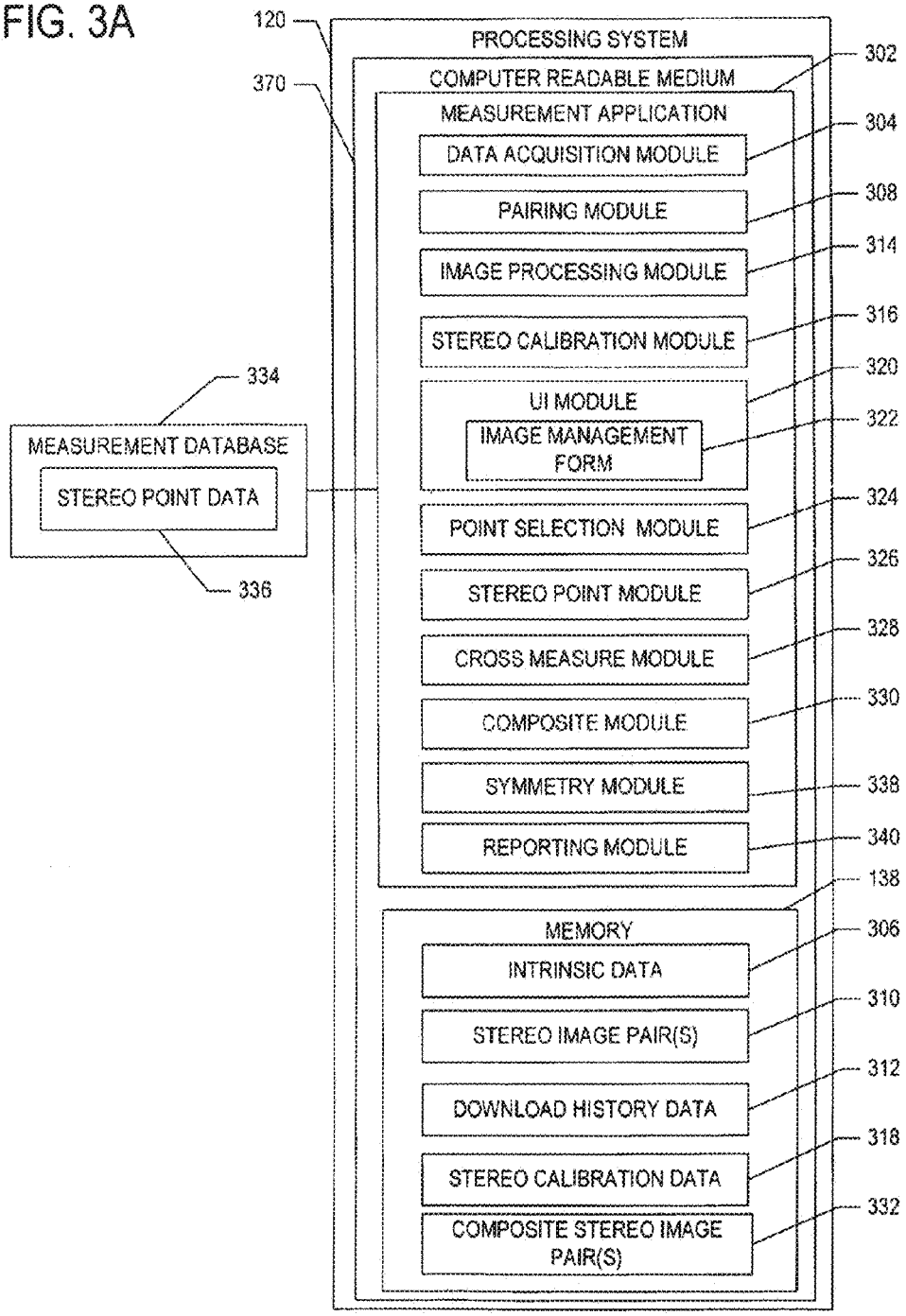
FIG. 3A is a block diagram of a stereoscopic measurement application according to one aspect of the stereoscopic measurement system.

Aspects of the stereoscopic measurement system and method described herein allow a user to generate stereo images of an object, to designate points within the stereo images of the object, and to obtain precision measurements in reference to the designated points. One aspect of the system is the provision of a portable capture device that allows a user to capture stereo images of objects at remote locations. The portable capture device transmits stereo images to a processing system to display the stereo images and to determine precision measurements between designated points within the stereo images. Furthermore, the system can be deployed in various environments, and is more portable and cost effective than conventional measuring systems.

FIG. 1 depicts an exemplary aspect of a stereoscopic measurement system 100. The stereoscopic measurement system 100 enables a user 102 to capture stereo images of an object 104 with a stereo image capture device 106. The stereo image capture device 106 comprises a left camera 108 and a right camera 110. The left camera 108 and right camera 110 are, for example, digital pinhole cameras located on opposing ends of a frame member 112.

A monitor 114 is centrally disposed between the left camera 108 and the right camera 110 on the frame member 112. The monitor 114 is configured to display a left image 116 captured by the left camera 108 and a right image 118 captured by the right camera 110. Although a single monitor 114 is depicted in FIG. 1, it is contemplated that separate monitors, such as depicted in FIGS. 2A and 2B, can be used to display the left image 116 and the right image 118.

Referring briefly to FIGS. 2A and 2B, aspects of an exemplary stereo image capture device 106 are depicted. In this aspect, the stereo image capture device 106 is a portable hand-held apparatus that comprises a backbone 202 that is sufficiently rigid to limit flexing. For example, the backbone 202 can be constructed from a lightweight material, such as plastic or another suitable material.

A left pod 204 is affixed to the left end of the backbone 202 and a right pod 206 is affixed to the right end of the backbone 202. The left pod 204 is configured to house the left camera 108, and the right pod 206 is configured to house the right camera 110.

A hub 208 is located at the center of the backbone 202 and houses a power source (not shown) for powering the left and right cameras 108, 110. For example, according to one aspect, the hub 208 comprises a battery compartment (not shown) that receives a battery. According to another aspect, the hub 208 comprises power input terminals (not shown) configured to connect with a power cord that is connected to a power outlet.

According to another aspect, the hub 208 comprises a left monitor 210 and a right monitor 212. The left monitor 210 and the right monitor 212 are, for example, liquid crystal display (LCD) monitors. The left monitor 210 is connected to the left camera 108 and displays the left image 116. The right monitor 212 is connected to the right camera 110 and displays the right image 118 of the object 104. The user 102 maneuvers the stereo image capture device 106 to display left and right images 116, 118 of a desired portion of the object 104 via the left and right monitors 210, 212. The central location of the monitors 210, 212 allows the user 102 to conveniently determine a common field of view for the left and right cameras 108, 110.

A left handle 214 is located to the left of the hub 208 and a right handle 216 is located to the right of the hub 208. Notably, it is contemplated that the handles 214, 216 of the image capture device 106 can be located in a different position or locations. The user 102 holds the image capture device 106 via the left handle 214 and right handle 216. According to one aspect, the left handle 214 comprises a switch 218 that controls the electronic shutters of the left camera 108 and the right camera 110. The switch 218 is wired to the left and right cameras 108, 110 to ensure that the corresponding left and right images 116, 118 are captured simultaneously. For example, when the left monitor 210 and right monitor 212 (or a single monitor 114) displays the left and right images 116, 118 of the desired area, the user 102 actuates or toggles the switch 218 to capture the left and right images 116, 118.

According to one aspect, the left camera 108 and right camera 110 are configured to transfer images and image data to the hub 208 via universal serial bus ("USB") cables. For example, the left camera 108 is wired to a communication port 220 by a USB cable, and the right camera 110 is wired to the communication port 220 by another USB cable.

According to another aspect, the hub 208 is mounted on a swivel such that it can be rotated independently from the left camera 108 and the right camera 110. As a result, the user 102 can view the monitors 210, 212 regardless of the orientation of the right and left cameras 108, 110.

According to another aspect, lamps 222, 224 are located next to the left and right cameras 108, 110. The purpose of the lamps 222, 224 is to illuminate the object 104 during capture of the left and right images 116, 118. In one example, the lamps 222, 224 are configured to turn on, or flash, when the switch 218 is toggled. In another example, the lamps 222, 224 are configured to turn on when a separate switch (not shown) is toggled.

Referring back to FIG. 1, the image capture device 106 is configured to transfer the left image 116 and the right image 118 to a processing system 120 for processing via a wired or wireless communication link. According to one aspect, the image capture device 106 is configured to wirelessly transfer images to the processing system 120 in response to the user 102 actuating a transmit switch (not shown) on the image capture device 106. In one example, a wireless transmitter 122 is connected to the image capture device 106 via the communication port 220. The transmitter 122 transmits a signal 124 comprising image data representative of the left and right images 116, 118. Although the transmitter 122 is depicted external to the image capture device 106, it is contemplated that the transmitter 122 may be integrated into the image capture device 106.

A wireless receiver 126 is connected to the processing system 120 and receives the signal 124 from the transmitter 122. The transmitter 122 and corresponding receiver 126 may utilize a Gigabit Ethernet link, IEEE 802.11 link, Ultra-Wide Band (UWB) link, or any other suitable wireless communication link. The wireless transmitter 122 and wireless receiver are optional in some embodiments.

According to another aspect, the image capture device 106 transfers the left image 116 and the right image 118 from the image capture device 106 to the processing system 120 via a wired connection 128 in response to the user 102 actuating the transmit switch (not shown). Alternatively, the processing system 120 automatically downloads images from the capture device 106 in response to detecting the wired connection 128 between the image capture device 106 and the processing system 120. The wired connection 128 can be a USB connection, a FireWire connection, or any other suitable wired connection.

In one embodiment, the processing system 120 comprises a stereoscopic measurement application ("measurement application") 130. The measurement application 130 comprises executable modules or instructions that enable the processing system 120 to process image data, display stereo images, and to obtain precise measurement data for designated points within stereo images. In one aspect, the processing system 120 is a remote computer, such as a laptop computer or a personal computer station. In another aspect, the processing system 120 is a server computer.

In an embodiment, a user interface (UI) 132 enables the user 102 to select images and/or to issue processing commands. Processing commands comprise, for example, commands to initiate image data acquisition from the image capture device 106 and/or commands to initiate image data analysis. In one example, the UI 132 comprises a display 134, such as a computer monitor, for viewing image data and an input device 136, such as a keyboard or a pointing device (e.g., mouse, trackball, pen, touch pad, or other device), for allowing the user 102 to interact with the image data.

In an example, the UI 132 is configured to display one or more input forms via the display 134. The input forms enable the user 102 to select image data for viewing and/or editing. The input forms also enable the user 102 to designate points within stereo images and to display measurement information for the designated points.

According to one aspect, the processing system 120 comprises a memory 138 for storing stereo image data for a particular object 104, including processed and/or raw image data. For example, the memory 138 comprises one or more files 140 each comprising processed and/or unprocessed image data for the object 104.

In one operational example, the stereoscopic measurement system 100 compares defined stereo points based on user-designated points within stereo images of the object 104 with known reference stereo points for that object. By comparing defined stereo points of stereo images of an object 104, such as a damaged vehicle to corresponding reference stereo points of an undamaged vehicle, the measurement system 100 determines one or more measurements between the defined stereo points and the reference stereo points to quantify an amount of damage to the vehicle. In one operational example, the object is damaged, and the processing system is configurable to measure points on a second object, wherein the second object corresponds to the object and is undamaged. In an embodiment, the damaged object is a part of the vehicle, and the second object is a corresponding part of the vehicle. For example, the damaged object may be a door frame on the driver's side of a vehicle, while the second object may be the corresponding door frame on the passenger side. In another embodiment, the damaged object is a part of a vehicle, and the second object is a corresponding part on an undamaged vehicle. The processing system is further configurable to designate at least three measurement points in a stereo image pair of the object and at least three measurement points in another stereo image pair of the second object.

According to one aspect, a method for recording information regarding a vehicle comprises providing a processing system with a memory. In the method, a user designates a first and second measurement point in a first image of a stereo image pair. The method further comprises designating or identifying the corresponding first and second measurement points in a second image of the stereo image pair. The method also comprises determining a first and a second stereo point corresponding to the first and second measurement points, respectively, and calculating a distance between the first and the second stereo points. The method comprises storing the measurement points, the stereo points, the calculated distance, and the stereo image pair in memory, and associating each of the points and the calculated distance with the stereo image pair.

Figure 16:
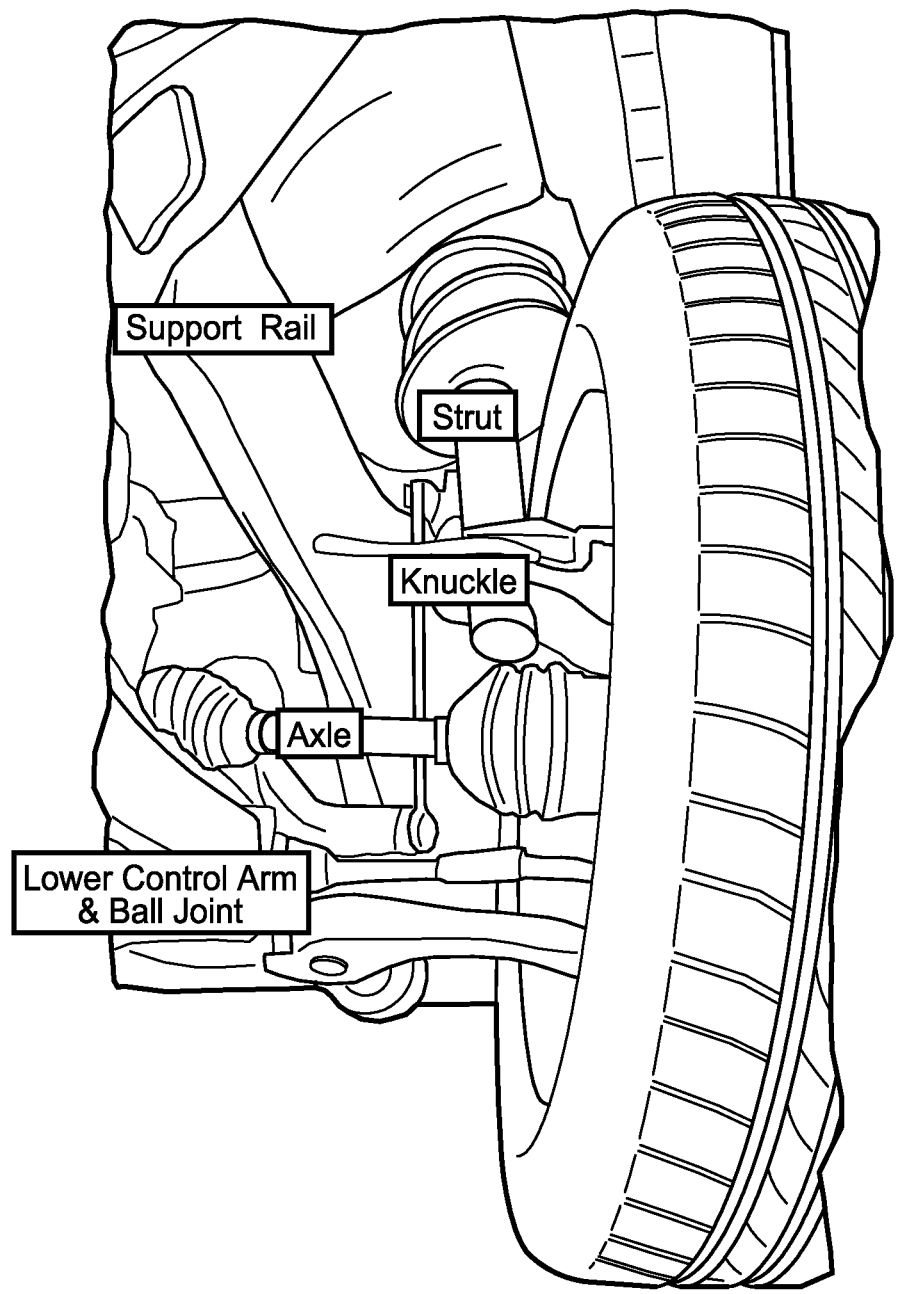
FIG. 16 is an illustration of a wheel and suspension system of a vehicle.

In one operational example, the stereoscopic measurement system 100 determines the wheel alignment of a vehicle. Measurement points designated and identified within stereo image pairs of portions of a vehicle are used to indicate the alignment. The system 100 is operable to determine the alignment of and/or damage to various vehicle subsystems, including a wheel and suspension subsystem, an engine cradle, a lower control arm, a unibody structure, lower rails, a rear toe, a rear thrust angle, and rear cradle. FIG. 16 is an illustration of some parts of a wheel and suspension subsystem. In another aspect, a stereoscopic image pair of the undamaged side of the vehicle is taken and stored. In another aspect, a stereoscopic image pair of an undamaged portion of another vehicle of the same model is taken and stored. The measurements of the reference points (spindle, rotor, knuckle, and strut, for example) of the undamaged side of the vehicle (or the undamaged portion of the other vehicle) are used for comparison with the damaged side reference points, and repair is performed so that the damaged side reference points match the undamaged side reference points. In another example, the designated points may be located on specific portions of the wheel and suspension subsystem, including the vehicle's rocker panel, spindle, rotor, knuckle, and strut. Previously, throughout the course of the repair, a vehicle body shop performing the collision repair transfers a vehicle multiple times to and from another facility that determines wheel alignment. The body shop uses the system 100 to determine wheel alignment during the course of repair, thus minimizing multiple transfers to the alignment facility.

In another operational example, the stereoscopic measurement system 100 detects a change in an object 104 that occurs over a period of time. For example, the stereoscopic measurement system 100 is used to calculate a current distance between two user-designated points in the stereo images of the exterior of a building. One of the designated points is, for example, a reference point such as a ground elevation benchmark that remains substantially constant over time. The other designated point is, for example, a target point on the exterior of the building. After a period of time has elapsed, the stereoscopic measurement system 100 is used to calculate the distance between the same reference point and the same target point of the building. Accordingly, a change in the calculated distance between the reference point and target point indicates, for example, that the foundation of the building has shifted and/or some other structural deviation has occurred.

Although the stereoscopic measurement system 100 is described herein as being used to obtain measurement data for vehicles and/or buildings, it is contemplated that the system 100 can be used to obtain measurements for any object 104 for which stereo images exist. In one embodiment, the stereo images are captured by the system. In another embodiment the system receives or retrieves existing images.

As another example, the stereoscopic measurement system 100 can be used to catalog a three dimensional image of an artifact or personal property, such as a vase. For instance, the stereoscopic measurement system 100 is used to capture various stereoscopic images of the vase. Thereafter, measurements can be calculated between selected points on the vase in all three dimensions. Thereafter, these measurements can catalog and later used to verify the authenticity of the vase and/or to generate a replica of the vase.

FIG. 3A depicts an exemplary stereoscopic measurement application 302 (e.g., measurement application 130) according to one aspect of the measurement system 100. The measurement application 302 comprises modules that enable the processing system 120 to process image data, to generate stereo images, and to obtain precise measurements for user designated points within a generated stereo image.

A data-acquisition module 304 is configured to receive image data from the image capture device 106. For example, when the wired connection 128 connects the image capture device 106 and the processing system 120, the data acquisition module 304 detects the wired connection 128 and receives the left and right images 116, 118 from the image capture device 106. As another example, when the left and right images 116, 118 are being transferred to the processing system 120 via a wireless communication, the data acquisition module 304 detects the wireless communication from the image capture device 106 via the receiver 126 and receives the left and right images 116, 118 from the image capture device 106. According to one aspect, the left and right images 116, 118 images are deleted from the left and right cameras 108, 110 after being transferred to the processing system 120.

According to another aspect, the data acquisition module 304 is configured to retrieve intrinsic data 306 from the left and right cameras 108, 110 for storage in the memory 138. As used herein, intrinsic data for a camera refers to geometric and optical characteristics of the lens and the camera as determined via a camera calibration process.

Camera calibration is the process of relating the ideal model of the camera to the actual physical device and determining the position and orientation of the camera with respect to a world reference system. Stereoscopic calibration typically involves an internal or intrinsic calibration process and an external or stereo calibration process. As described in more detail below, stereo calibration typically involves determining the position and orientation of the left camera 108 and right camera 110 relative to each other with respect to a world reference system.

The purpose of intrinsic calibration is to determine intrinsic data 306, such as lens distortion, focal length, and the principal point of an image for a particular camera. Intrinsic data 306 is determined separately for each of the left and right cameras 108, 110. According to one aspect, intrinsic calibration is performed during the final stages of the manufacturing process of the image capture device 106. For example, after the image capture device 106 has been assembled and is operable, intrinsic data 306 is determined separately for each of the left camera 108 and right camera 110.

According to one aspect, the determined intrinsic data 306 for the left camera 108 is stored in a memory of the left camera 108, and the determined intrinsic data 306 for the right camera 110 is stored in a memory of the right camera 110. In one aspect, the determined intrinsic data 306 is stored as XML files in the memory of each camera. By determining intrinsic data 306 for each camera, the imperfections of a point on an image can be effectively neutralized, thereby linking the point with the corresponding coordinates in the camera coordinate system.

Figure 3B:
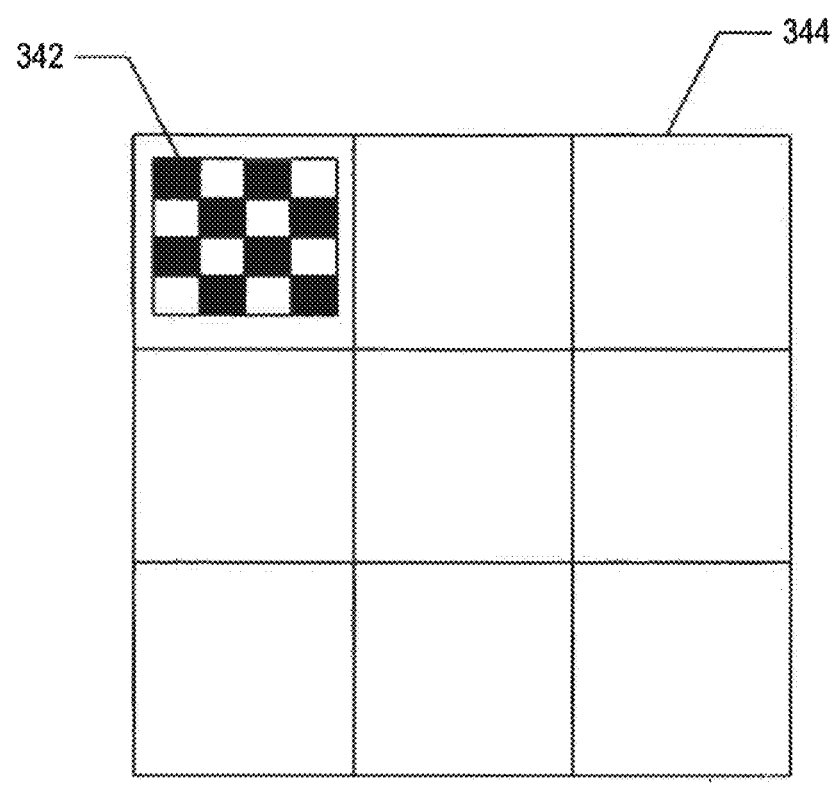
FIGS. 3B-3D are image views of a camera sectioned for intrinsic camera calibration.
Figure 3C:
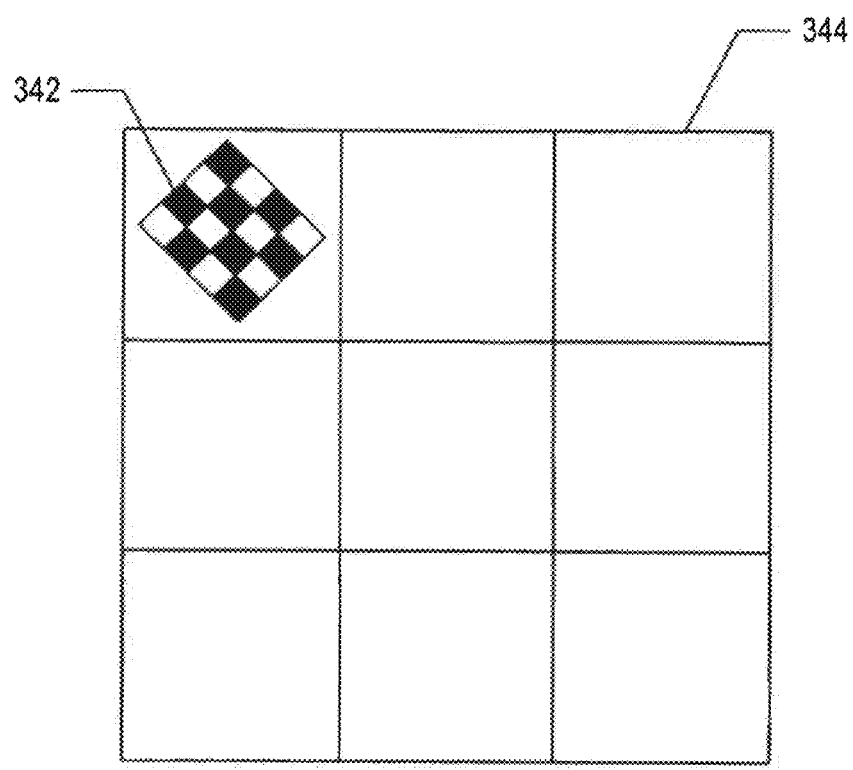
Figure 3D:
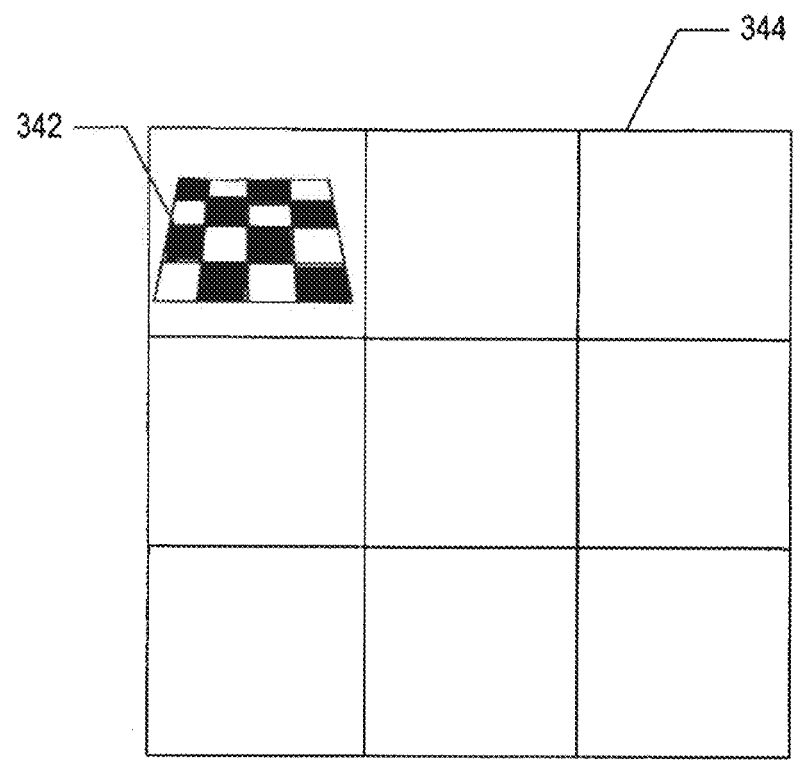

According to one aspect, intrinsic data 306 is determined for each of the left and right cameras 108, by first capturing a series of photos of a calibration image or jig 342 such as shown in FIGS. 3B and 3D. According to one aspect, the calibration image consists of alternating black and white squares or rectangles arranged in a planar checkerboard pattern. The series of photos are obtained for various orientations of the calibration image 342.

In one example, the field of view of each camera, or image view space, 344 is divided into nine sections (i.e., three rows and three columns). FIG. 3B depicts the calibration image 342 in a first orientation positioned in a section of the image view space 344 that corresponds to the top row and the left column. Images of the calibration image 342 in the first orientation are captured in each of the nine sections by each camera. FIG. 3C depicts the calibration image 342 in a second orientation (e.g., rotated approximately forty-five degrees). Images of the calibration image 342 in the second orientation are captured in each of the nine sections by each camera. FIG. 3D depicts the calibration image 342 in a third orientation (e.g., tilted backward approximately forty-five degrees). Images of the calibration image 342 in the third orientation are captured in each of the nine sections by each camera.

The dimensions of the individual checker patterns are known. As a result, the camera intrinsic values of focal length, lens distortion, and principal point location can be determined. For example, image processing techniques are used to identify the corners of each square in the checkerboard and construct perspective lines connecting these corners. If the perspective lines are slightly curved instead of straight, a formula can be derived to straighten their curviness and used thereafter to remove image distortions. As a result, the formula can be used to establish a mapping of world straight lines to image straight lines. In one example, this formula is a row vector of scalar values representing lens distortion and the misalignment of the optical axis center of the image plane, called the principal point, to the mechanical axis of the image plane. The two corners along any edge of a square in the checkerboard correspond to pixels representing these corners on the image plane. Homogeneous vectors drawn from the image sensor cross at the focal point and pass through the corners of the square of known size. The focal length is determined as the height of the triangle formed by these two lines from the image plane to the planar checkerboard pattern.

According to another aspect, the data acquisition module 304 is configured to determine if the intrinsic data 306 retrieved from the left camera 108 and right camera 110 has been updated before storing the intrinsic data 306 in the memory 138. For example, when the intrinsic data 306 is stored as an XML file, the data acquisition module 304 compares XML file metadata, such as a creation date and time associated, with XML files being retrieved from each camera, with similar XML file metadata associated with XML files previously stored in the memory 138. If XML file metadata associated with XML files being retrieved from the left camera 108 and right camera 110 indicates that the creation date and time for those XML files was created after XML files previously stored in the memory 138, the data acquisition module 304 replaces the previously stored XML files with the XML files being retrieved from the left camera 108 and right camera 110.

According to another aspect, a pairing module 308 pairs the left image 116 and the right image 118 to create a stereo image pair 310. The pairing module 308 then stores the stereo image pair 310 and corresponding download history data 312 in the memory 138. The download history data 312 comprises, for example, a time and date that the image data from the left and right cameras 108, 110 included in the stereo image pair 310, were transferred from the image capture device 106 to the processing system 120. According to another aspect, the download history data 312 comprises metadata for each of the left and right cameras 108, 110. Metadata identifies, for example, a camera model, a film type, and left or right camera.

An image-processing module 314 processes the stereo image pair 310 to determine if the left and right images 116, 118 are images of a calibration image 342. For example, the image-processing module 314 employs a pattern recognition algorithm to detect the known geometrical pattern of the calibration image 342 in the stereo image. If the image-processing module 314 determines a particular stereo image pair 310 comprises images of a calibration image 342, a stereo calibration module 316 is executed.

The stereo calibration module 316 is configured to determine stereo calibration data 318 for the image capture device 106. For example, the stereo calibration module 316 determines the pinhole locations for the left and right cameras 108, 110 relative to a common element within a calibration pattern (e.g., calibration image 342) to establish a reference origin for a coordinate system that corresponds to the image capture device 106. In another aspect, the stereo calibration module 316 determines the separation distance between the center of the pinhole locations for the left and right cameras 108, 110 and the angular positioning of each of the cameras in relation to the image capture device 106. The determined pinhole locations for the left and right cameras 108, 110, the separation distance, and the angular position of left and right cameras 108, 110 are referred to collectively as stereo calibration data 318. In one aspect, stereo calibration data is a matrix, either called the essential matrix or the fundamental matrix, comprising both translation and rotation values describing the stereo calibration data 318. The stereo calibration module 316 stores the stereo calibration data 318 in the memory 138. The stereo calibration data 318 is used to triangulate the exact location of user-designated points within a stereo image pair 310.

According to one aspect, stereo calibration is performed just prior to capturing images of a particular object 104 for which measurement information is desired. Environmental conditions, such as temperature and humidity levels, can affect the shape of the image capture device 106 (e.g., material contraction and expansion), and, thus, affect the positioning of the cameras 108, 110 relative to each other. By performing stereo calibration prior to capturing images of a desired object 104, the stereo calibration data 318 can be determined based on the most current positioning of the cameras 108, 110 relative to each other.

According to one aspect, stereo calibration involves using a calibration image (e.g., calibration image 342) to determine the current position of the left and right cameras 108, 110 relative to each other. For example, the image capture device 106 captures left and right images 116, 118 of the calibration image. The size of the individual checker patterns in the image, the focal length of the cameras, principal point, and lens distortion are known parameters. As a result, the separation distance and/or angular position between the left and right cameras can be determined by applying triangulation techniques to selected points in the left and right images. Triangulation is described in more detail below in reference to FIGS. 6A and 6B.

According to another aspect of the stereoscopic measurement system 100, the image-processing module 314 associates the stereo calibration data 318 with a stereo image pair 310 based on the download history data 312. For example, a stereo image pair 310 that has a transfer date and time that is subsequent to the date and time associated with a particular stereo image pair 310 in which the calibration image 342 was detected, is associated with the stereo calibration data 318 determined from that particular stereo image pair 310.

Figure 11:
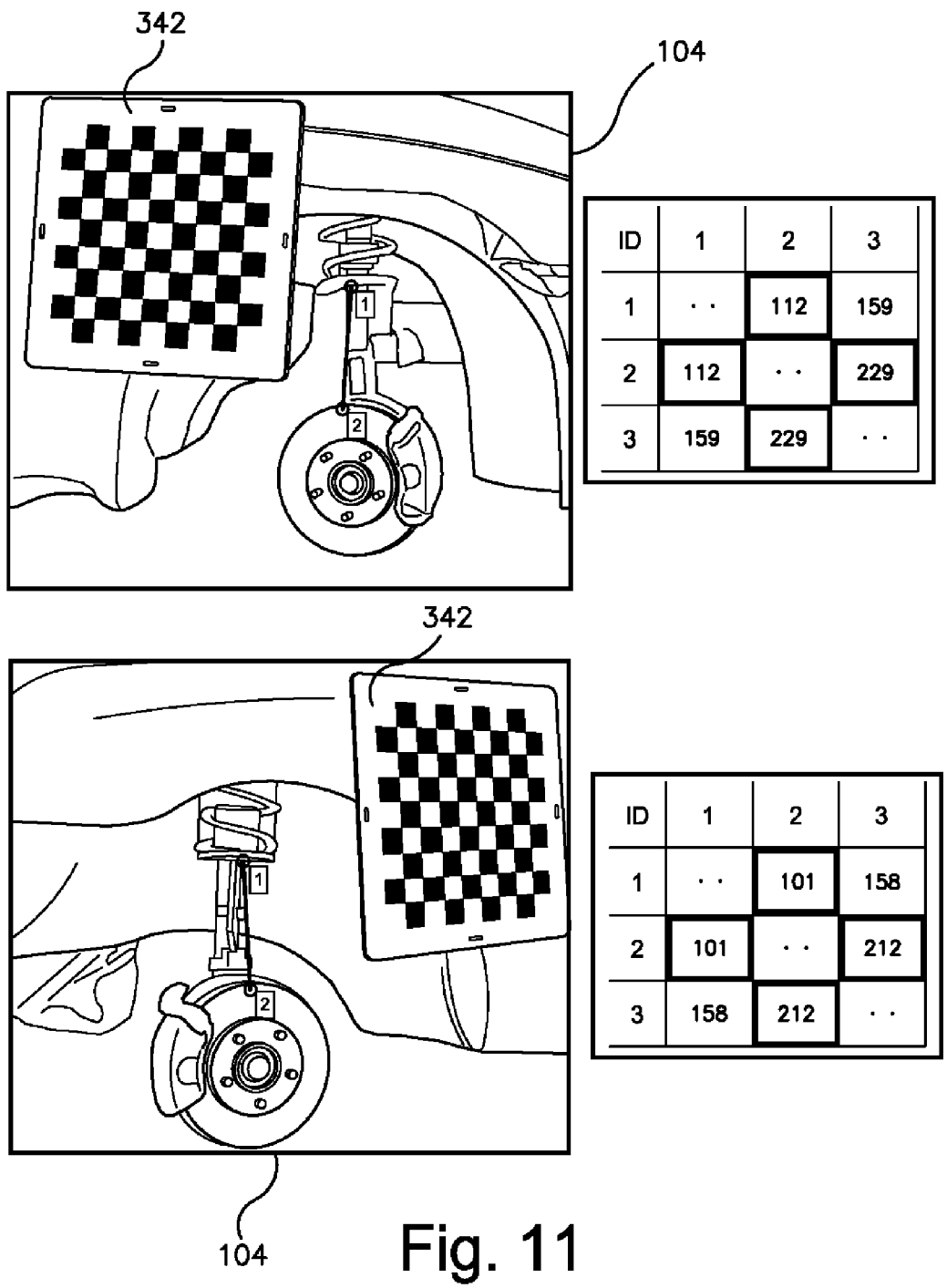
FIG. 11 is an illustration of the calibration pattern in the image of the object.
Figure 12:
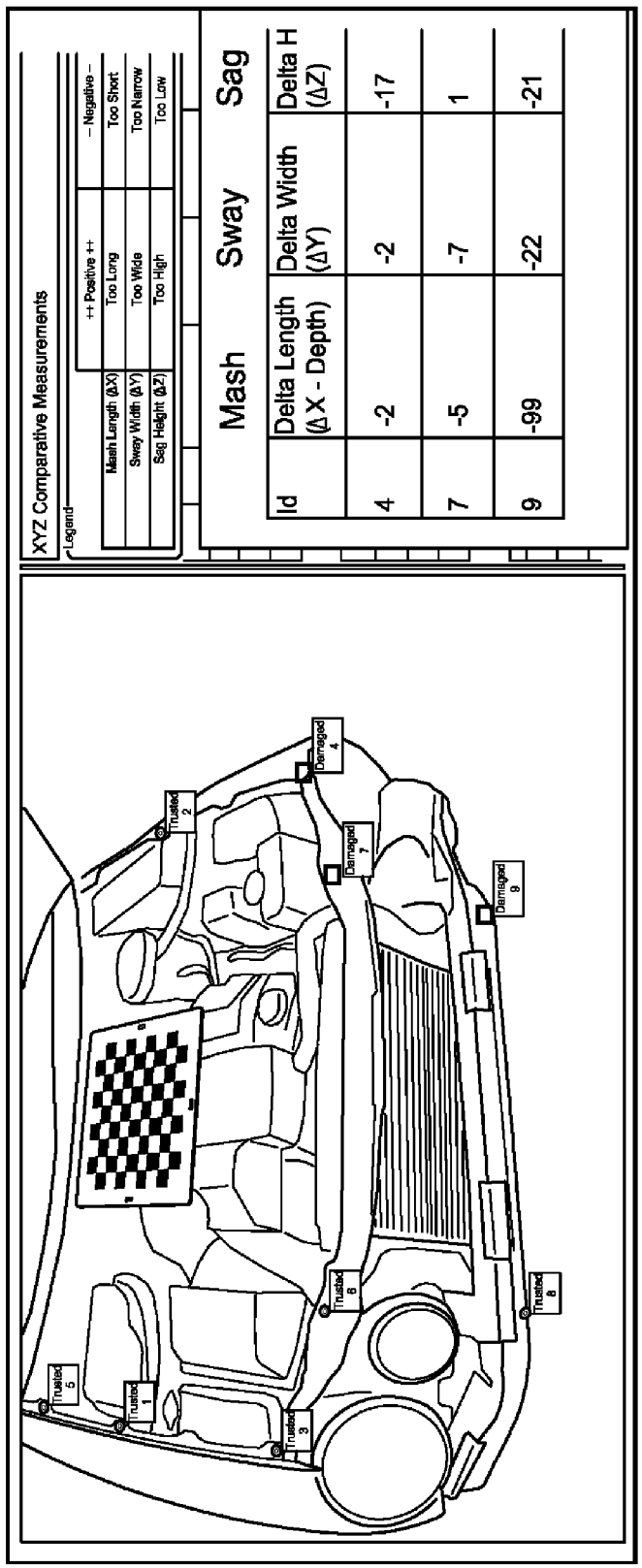
FIGS. 12-15 are illustrations of some reference coordinate planes.
Figure 13:
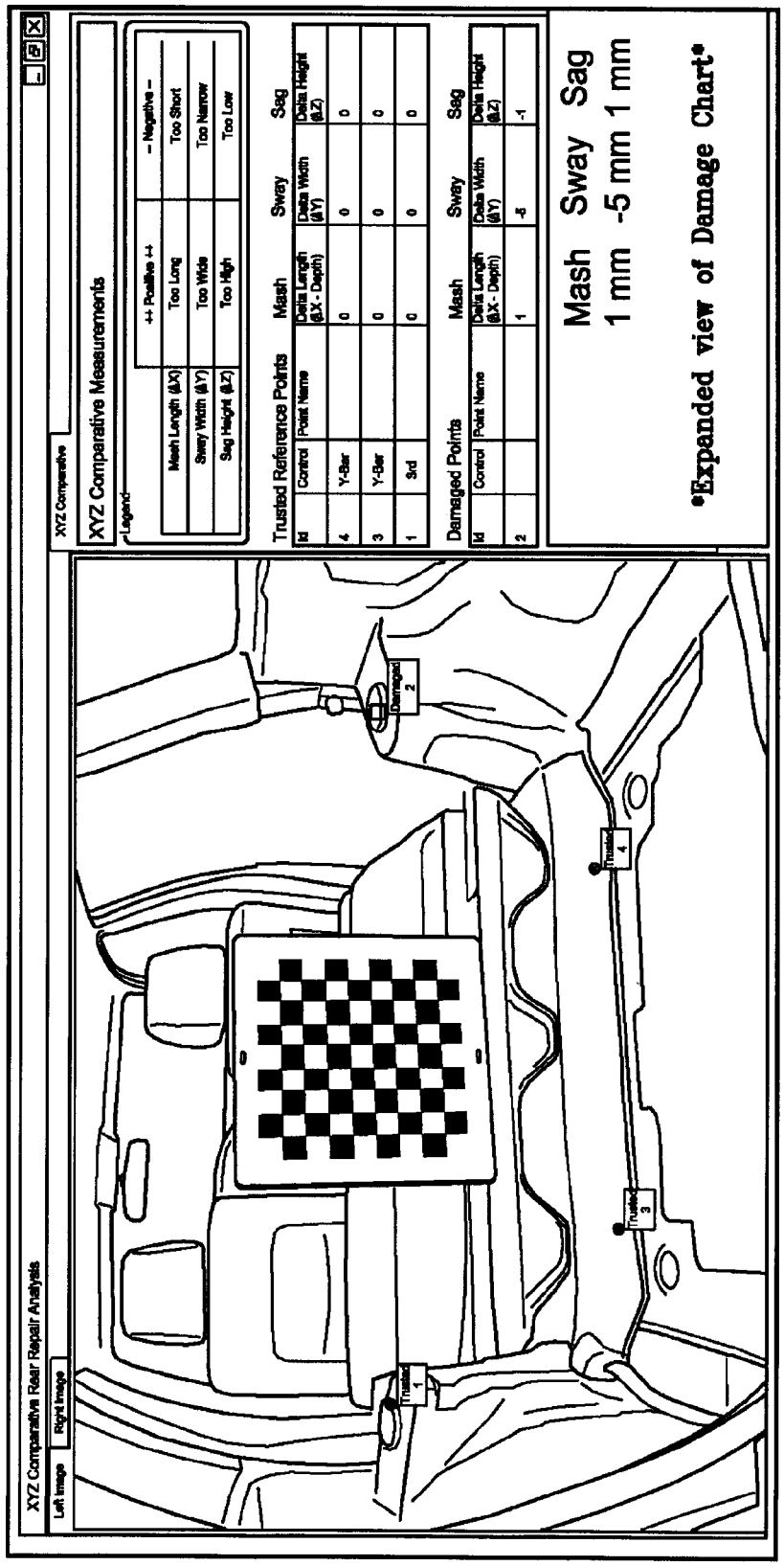
Figure 14:
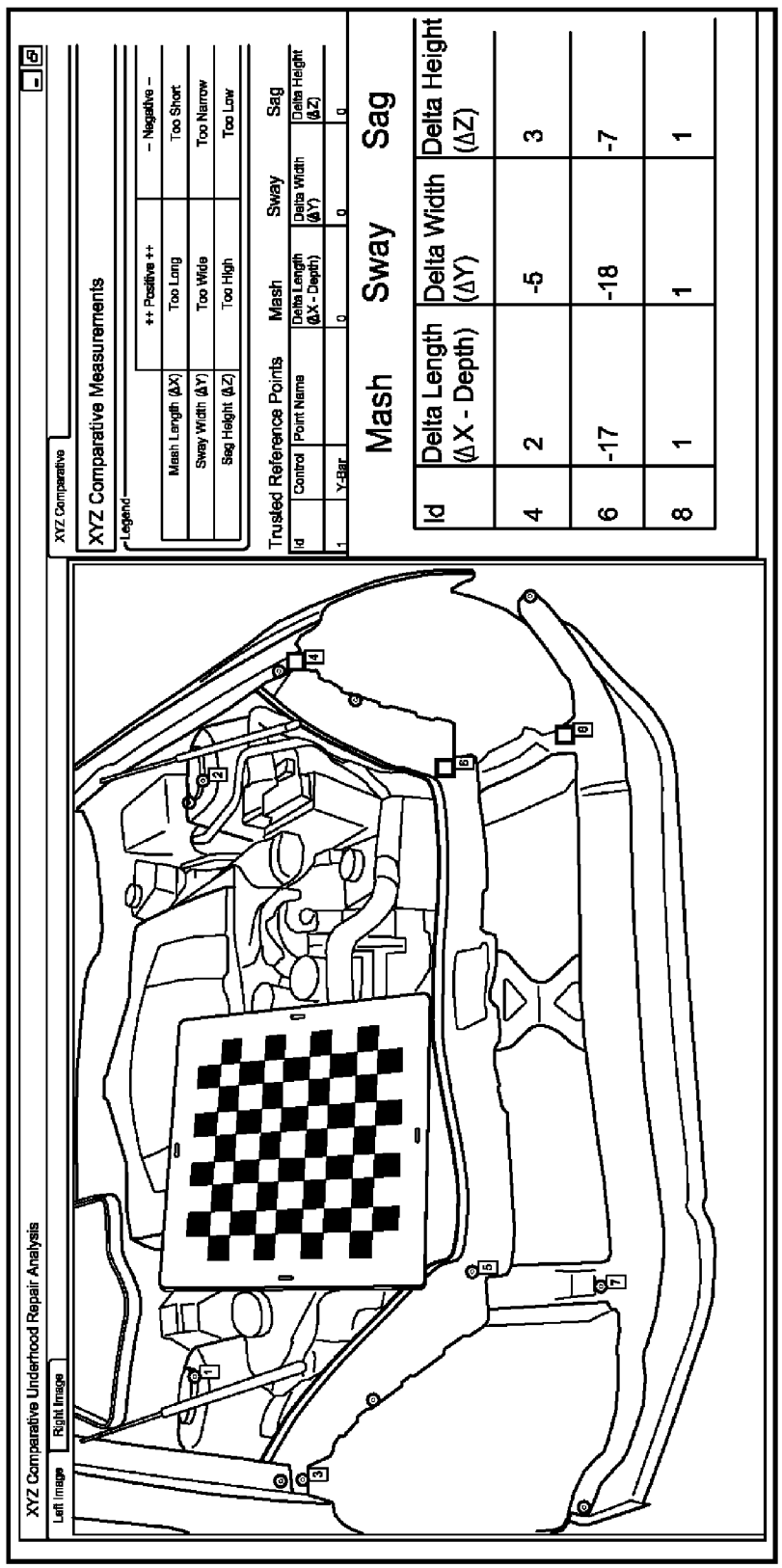
Figure 15:
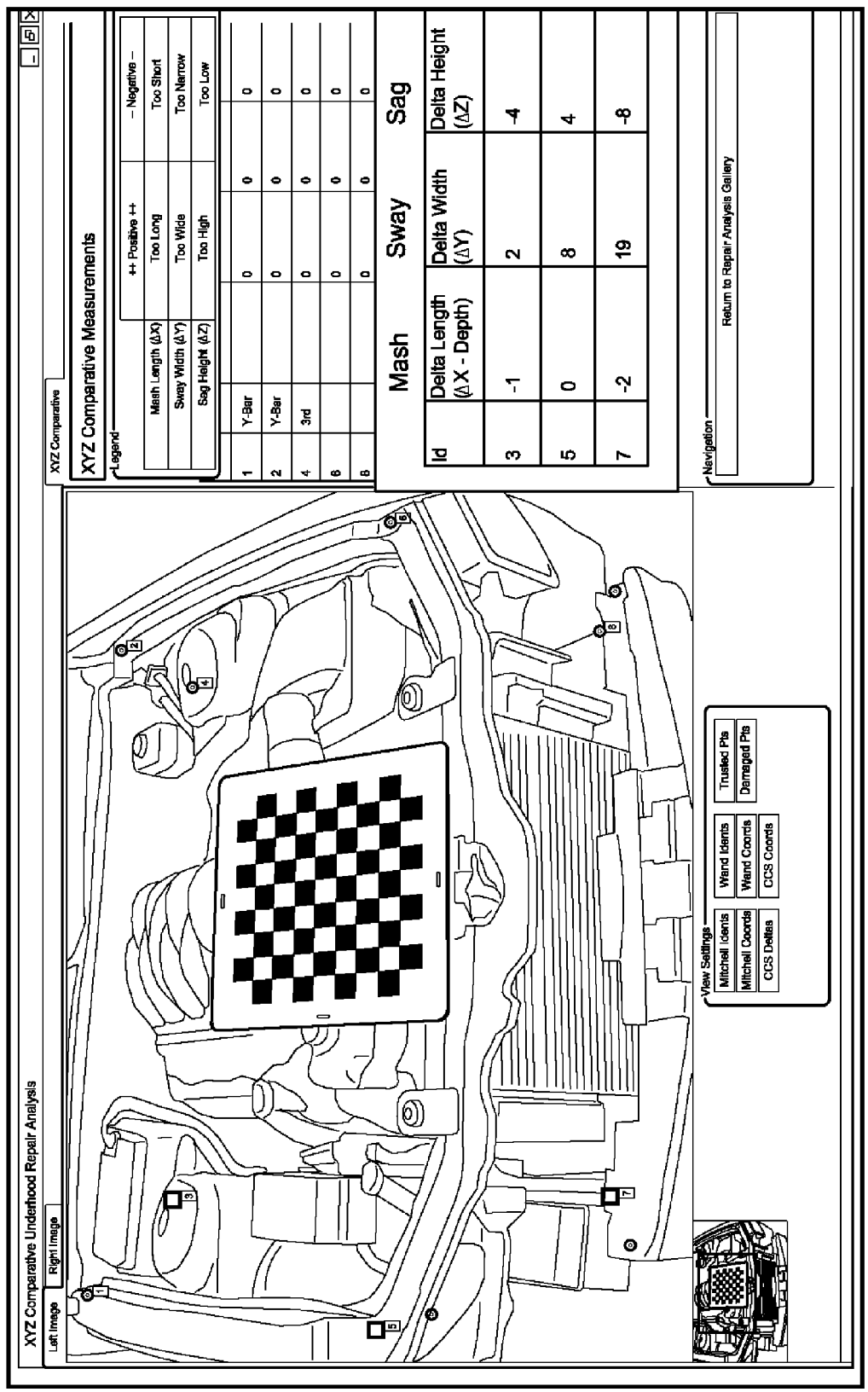

In one aspect, a calibration image (e.g., calibration image 342) is captured together with each image of a particular object 104 for which measurement information is desired. See FIG. 11. By capturing the calibration image 342 with every image of a particular object 104, stereo calibration data 318 is determined for each image, and the stereo calibration data for each image can be determined independently from the stereo calibration data for another image.

A user interface (UI) module 320 is configured to generate an image management form 322 for the display via the UI 132. In one example, the UI module 320 retrieves the stereo image pair 310 from the memory 138 and allows the user 102 to interact with the left and right images 116, 118 included in the stereo image pair 310 via the image management form 322 on the display 134. The image management form 322 comprises various views that allow a user to display image data, to interact with image data, and to specify points within a stereo image pair 310 for measurement.

Figure 4A:
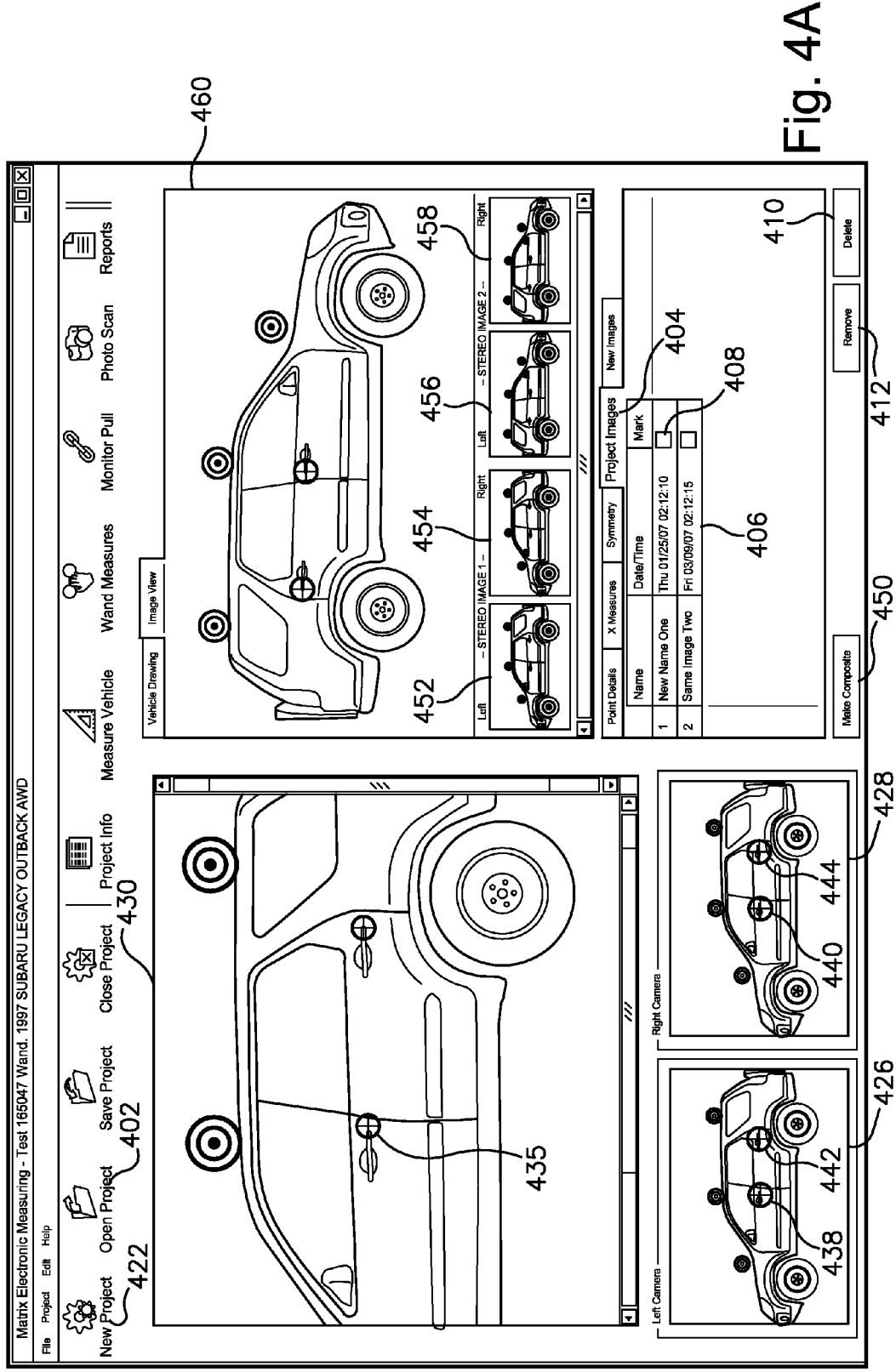
Figure 4D:
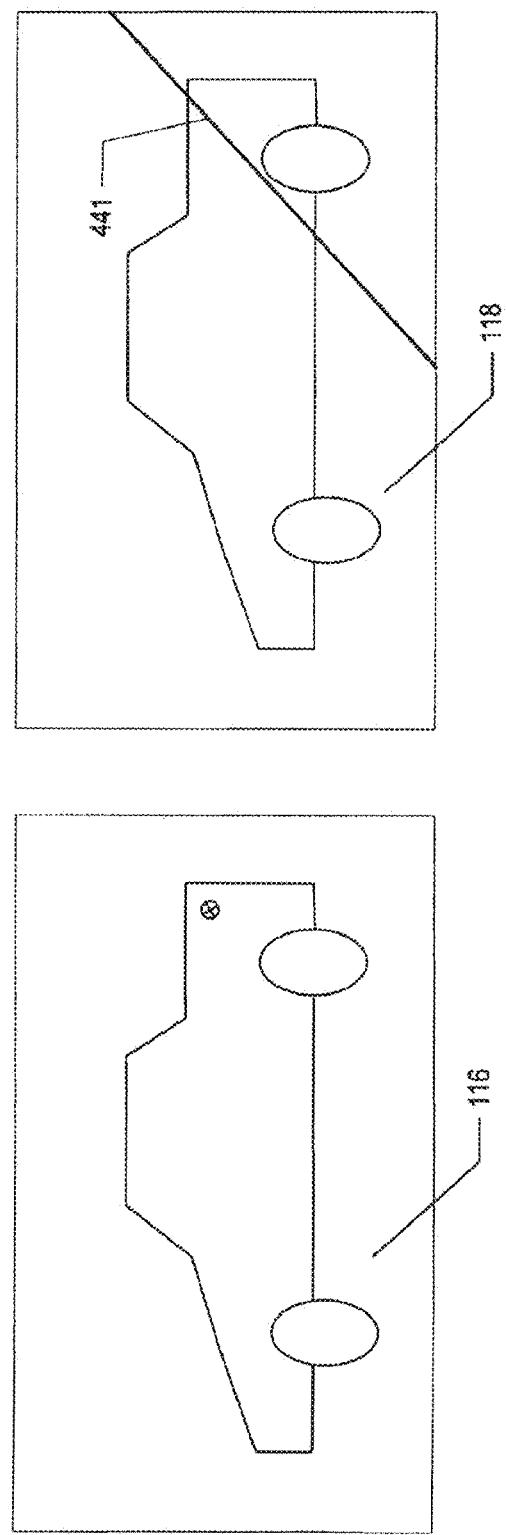

FIGS. 4A and 4D depict various screen views of an image management form 322 displayed on the display 134. In one aspect, the user 102 interacts with the image management form 322 depicted in FIG. 4A via an input device (e.g., input device 136) to display an existing project. As used herein, the term "project" refers to a file that comprises one or more stereo image pairs 310. For example, the user 102 uses the input device 136 to select an open project control 402 on the image management form 322 to display a list of existing projects, such as depicted in FIG. 4B. Thereafter, the user 102 selects a particular project from the list of existing projects to open using standard file opening techniques.

According to another aspect, the user 102 uses the input device 136 to interact with the image management form 322 to display a list of stereo images pairs 406 included in the selected project. For example, the user 102 uses the input device 136 to select a project images control 404 to display the list of stereo images pairs 406 included in the selected project.

According to another aspect, the user 102 uses the input device 136 to interact with the image management form 322 to delete one or more stereo images from the list of stereo images pairs 406 included in a project. For example, the user 102 uses the input device 136 to enable or select a check box control 408 adjacent to a stereo image pair 310. Thereafter, the user 102 uses the input device 136 to select, for example, a delete control 410 to permanently delete the selected stereo image pair 310 from memory 138. In another example, the user 102 uses the input device 136 to select, for example, a remove control 412 to remove the selected stereo image pair 310 from the project, but not from the memory 138.

According to another aspect, the user 102 interacts with the image management form 322 to add one or more new stereo images pairs to an existing project. For example, the user 102 uses the input device 136 to select a new images tab 414, such as shown in FIG. 4C, to display a list of new stereo image pairs 416. In one example, the user 102 selects a stereo image pair 310 from the list of new stereo image pairs 416 by using the input device 136 to enable or select a check box 418 adjacent a desired new stereo image pair 310. Thereafter, the user 102 uses the input device 136 to select, for example, an add control 420 to add the selected stereo image pair 310 to the existing project.

According to another aspect, the user 102 interacts with the image management form 322, such as depicted in FIG. 4C, to create a new project. For example, the user 102 uses the input device 136 to select a new project control 422 on the image management form 322 to display the list of new stereo image pairs 416. The user 102 then uses the input device 136 to select one or more stereo image pairs 310 from the list of new stereo image pairs 416 to include in the new project. For example, the user 102 uses the input device 136 to enable or select the check box 418 adjacent the desired new stereo image pair 310. Thereafter, the user 102 uses the input device 136 to select the add control 420 to add the selected stereo image pair 310 to the new project.

According to another aspect, the user 102 interacts with the image management form 322, such as depicted in FIG. 4C, to delete one or more stereo image pairs from the list of new stereo image pairs 416. For example, the user 102 uses the input device 136 to enable or select the check box 418 adjacent to a desired new stereo image pair 310. Thereafter, the user 102 uses the input device 136 to select, for example, a delete control 424 to delete the selected stereo image pair 310 from the list of new stereo images 416.

According to another aspect, the user 102 interacts with the image management form 322 to select a particular stereo image pair 310 within a particular project for viewing. For example, the user 102 uses the input device 136 to enable the check box control 408 (see FIG. 4A) adjacent to a stereo image pair 310 included in the list of stereo images 406 for an existing project. As another example, the user 102 uses the input device 136 to enable the check box 418 (see FIG. 4C) adjacent to a stereo image pair 310 included in the list of new stereo images 416 for a new project.

The UI module 320 generates the selected stereo image pair 310 for display in a left image window 426 and a right image window 428 of the image management form 322 in response to the users' selection. In particular, the left image window 426 displays the left image 116 of the stereo image pair 310 and the right image window 428 displays the right image 118 of the stereo image pair 310.

According to another aspect, the UI module 320 displays the left image 116 or the right image 118 in an active window 430 in response to the user 102 selecting the left image window 426 or the right image window 428. For example, the user 102 uses the input device 136 to select the left image window 426 to display the left image 116 in the active window 430 or to select the right image window 428 to display the right image 118 in the active window 430. Notably, the stereo image pair 310 displayed in FIG. 4C comprises left and right images 116, 118 of a calibration image 342.

Figure 4E:
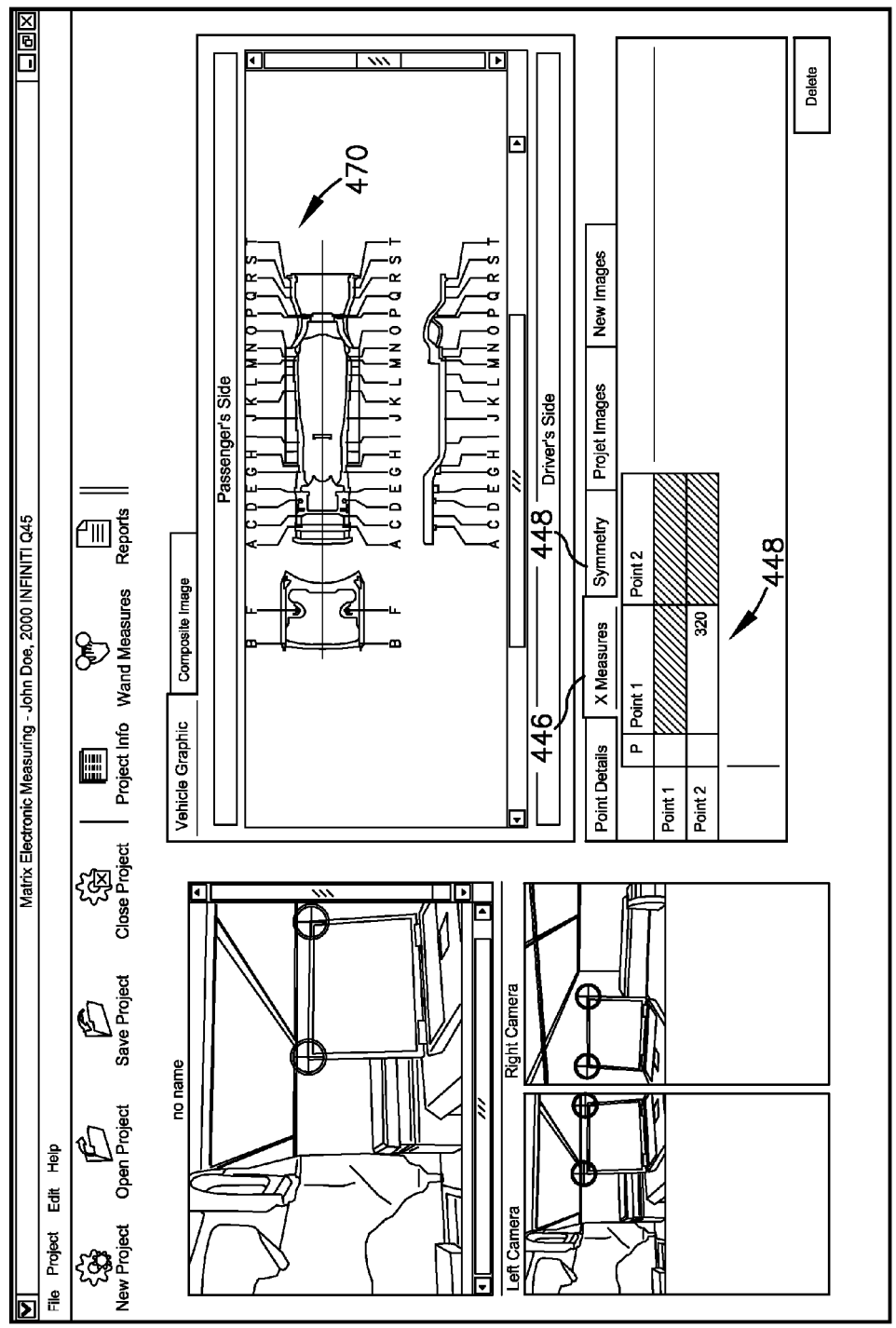

According to another aspect, the user 102 interacts with the image management form 322 to designate one or more measurement points within an image displayed in the active window 430. For example, the user 102 selects either the left image window 426 or the right image window 428 to display the corresponding left image 116 or right image 118 in the active window 430. The user 102 then uses the input device 136 to pan across and/or zoom in and out of the image displayed in the active window 430. In one example, the selected image window (e.g. left image window 426 or right image window 428) that corresponds to the image (e.g. left image 116 or right image 118) displayed in the active window 430 comprises a focus rectangle 434, such as shown in FIG. 4E. The focus rectangle 434 outlines the portion of the image visible in the active window 430. The user 102 can pan the image in the active window 430 by using the scroll bars 436 adjacent to the active window 430. Alternatively, the user 102 pans the image in the active window 430 by dragging the focus rectangle 434 by, for example, positioning a mouse pointer over the focus rectangle 434, pressing and holding the mouse button while the focus rectangle 434 is moved to the desired location.

After the user 102 visually locates the desired measurement point, the user 102 interacts with the image in the active window 430 to select the point. In one example, the user 102 positions a mouse pointer over the desired location and clicks the mouse button to designate the point. In response to a point designation by the user 102, the UI module 320 displays a precision mark 438 at the location on the image displayed in the active window 430 where the user designate the point.

According to another aspect, the user 102 interacts with the image displayed in the active window 430 to fine-tune the location of the designated point. For example, the user uses arrow keys of a keyboard to adjust the location of the point.

In one aspect, the user 102 designates the same measure points in both the left image 116 and right image 118 of the stereo image pair. Therefore, after designating the desired point in a first image (e.g. left image 116) of the stereo image pair 310, the user 102 selects the other image window (e.g. right image window 428) to display the second image (e.g. right image 118) of the stereo image pair 310 in the active window 430. The user 102 then designates the same point in the second image being displayed in the active window 430. In response to the user's point designation, the UI module 320 displays another precision mark 440 at the location on the second image displayed in the active window 430 where the user designated the same point. In other words, the user 102 selects common points in both of the left and right images 116, 118 of the stereo image pair 310.

Referring back to FIG. 3A, a point selection module 324 is configured to assist a user 102 to select the same point in the right image 118 by automatically identifying a range of points in the right image 118 that correspond to the point designated by the user 102 in the left image 116. As described above, left camera 108 and right camera 110 are, for example, pinhole cameras.

Figure 5A:
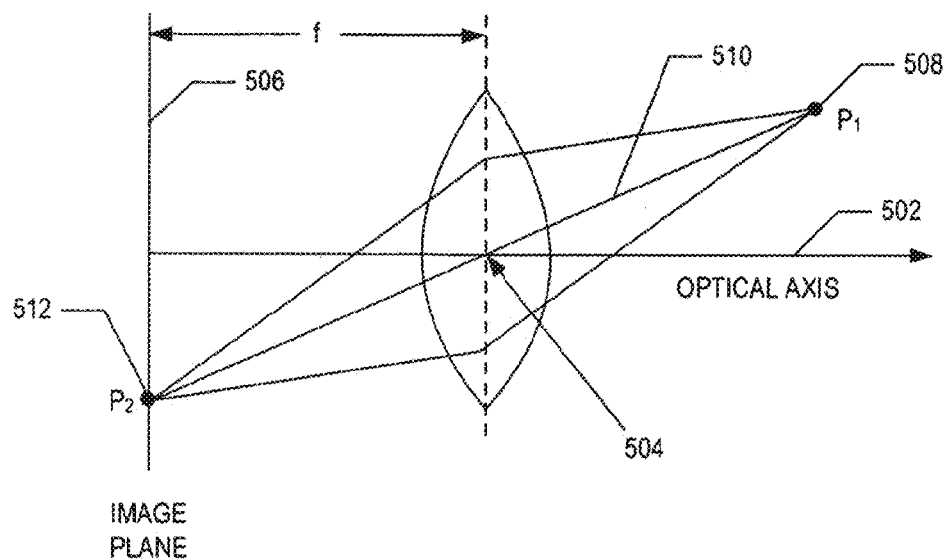
FIG. 5A is a geometric mapping model for a pinhole camera.

FIG. 5A depicts the pinhole model of a camera. An optical axis 502 extends in the view direction of the camera. All projection lines, or homogeneous vectors, of an image pass through a pinhole 504 of the camera. An image plane 506 is where a particular point ($P_1$) 508 in the three dimensional world (X, Y, Z) is projected through the pinhole 504 of the camera. For example, a projection vector 510 or line from point $P_1$ 508 will pass through the pinhole 504 onto the image plane 506 of the camera at a point $P_2$ 512. The distance between the pinhole 504 and the image plane 506 along the optical axis 502 is the focal length, f, of the camera.

Figure 5B:
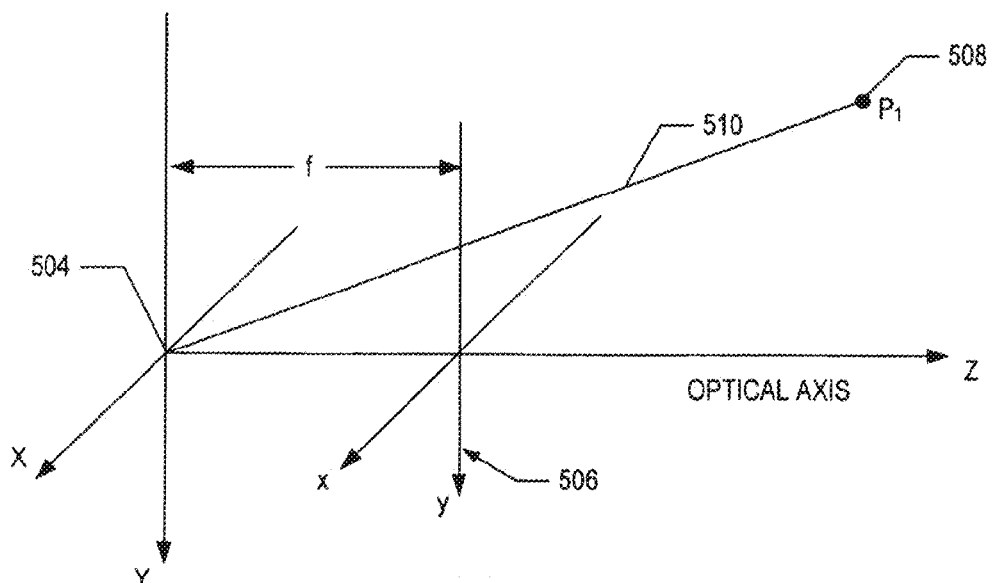
FIG. 5B is a three-dimensional model of the coordinate system for a pinhole camera.

FIG. 5B depicts a three-dimensional coordinate system for the pinhole model used as the basis for single-camera and stereoscopic mathematics. Place the pinhole 504 of the camera (e.g., left camera) at the origin O of the coordinate system, and the image plane 506 parallel to the XY plane of the coordinate system. The relation between the three dimensional world coordinates of point $P_1$ 508 and the coordinates on the image plane (x, y) can be expressed by the following:

$$x = f * X/Z \quad (1);$$

$$y = f * Y/Z \quad (2);$$

where f is the focal length of the lens. Thus, the homogeneous vector 510 defines a point on the image plane of the camera.

Referring back to FIG. 3A, the point selection module 324 defines a range of possible matching points in the right image 118 based on a designated point in the left image 116. According to one aspect, the point selection module 324 uses the series of points defined by a homogeneous vector (e.g., projection vector 510) in FIG. 5B from a designated point in the left image 116 along with intrinsic calibration data and stereo calibration data for the left camera 108 and the right camera 110 to define a range of possible matching points in the right image 118. As described above, intrinsic calibration data comprises focal lengths, principal points, and lens distortions for the left camera 108 and right camera 110 and stereo calibration data includes the relative translation and rotation of the left camera 108 and right camera 110.

According to another aspect, the point selection module 324 generates a selection line 441, such as depicted in FIG. 4D, on the right image 118 when displayed in the active window 430. The selection line 441 corresponds to the range of possible points in the right image 118 that correspond to the point designated in the left image 116.

According to another aspect, the point selection module 324 is configured to automatically identify a point in the right image 118 that corresponds to the point designated by the user in the left image 116. For example, in addition to generating a selection line 441 in the right image 118, the point selection module 324 utilizes a pattern recognition algorithm to identify a point along the selection line 441 that corresponds to the point designated by the user 102 in the left image 116. For example, the point selection module 324 determines the value of each pixel adjacent to the point selected by the user 102 in the left image 116.

Digital images are comprised of pixels, and each pixel has a value that represents a grayscale value or color value. In grayscale images, the pixel value is a single number that represents the brightness of the pixel. The most common pixel format is the byte image, where this number is stored as an 8-bit integer giving a range of possible values from 0 to 255. Typically, a pixel value of zero is taken to be black, and a pixel value of 255 is taken to be white. Values in between make up the different shades of gray. In color images, separate red, green, and blue components must be specified for each pixel (assuming an RGB color space). In other words, the pixel value is actually a vector of three numbers. The three different components can be stored as three separate grayscale images known as color planes (one for each of red, green and blue), which can be recombined when displaying or processing.

The point selection module 324 then compares the determined values of the pixels adjacent to the point selected by the user in the left image 116 to identify a particular point that has adjacent pixels with matching values along the selection line 441 in the right image 118. The UI module 320 displays the other precision mark 440 at the location in the right image 118 that corresponds to same point designated in the left image 116.

The user 102 repeats the point selection process to define a second measurement point in each of the right and left images 116, 118. For example, the user 102 selects the left image window 426 to display the left image 116 in the active window 430, and then uses the input device 136 to perform pan and/or zoom operations to locate a desired second measurement point in the left image 116. After the user visually locates the second measurement point, the user 102 uses the input device 136 to designate the location of the second point in the left image 116 as described above in reference to the first measurement point. In response to the user's second point designation, the UI module 320 displays a precision mark 442 at the designated location in the left image 116.

The user 102 then interacts with the image management form 322 to designate the same second measurement points in the right image 118. For example, the user 102 selects the right image window 428 to display the right image 118 in the active window 430. The user 102 uses the input device 136 to designate the location of the same second measurement points in the right image 118.

Alternatively, the user uses the input device 136 to designate the location of the same second measurement points in the right image 118 along another selection line (not shown) generated in the right image 118. The other selection line is generated by the point selection module 324 and corresponds to the range of possible points in the right image 118 that correspond to the second measurement point. In another aspect, the user 102 relies on the point selection module 324 to automatically locate the same second measurement point in the right image 118. The UI module 320 displays a precision mark 444 at the location in the right image 118 that corresponds to same point designated in the left image 116.

A stereo point module 326 uses triangulation to define a stereo point in the virtual three-dimensional coordinate system of the image capture device 106 based on the common points designated in both the left image 116 and right image 118 of the stereo image pair 310. In other words, a stereo point or three dimensional position of a designated point can be reconstructed from the perspective projections of that point on the image planes of the left and right cameras 108, 110 once the relative position and orientation of the two cameras are known. The stereo point corresponds to the x, y, z coordinate values of the common designated point in the left and right images 116, 118 as determined from triangulation.

Figure 6A:
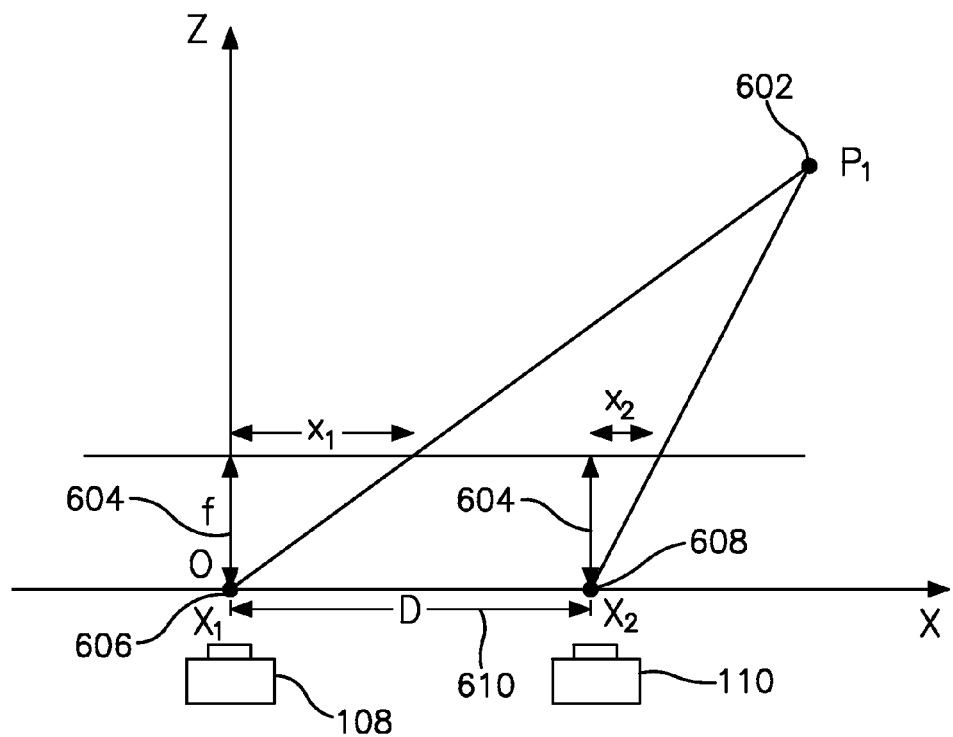
FIG. 6A-6B are triangulation models for determining the location of a point in a coordinates system of an image capture device.

FIG. 6A depicts an epipolar triangulation model for determining the location of a point $P_1$ 602 in a coordinate system of the image capture device 106. The left camera 108 and the right camera 110 are each pinhole cameras with parallel optical axes. For purposes of illustration assume that the left camera 108 and right camera 110 each have the same focal length f 604. Further, assume that the center of left camera 108 is located at $X_1$ 606 along the X-axis and that the center of the right camera 110 is located at $X_2$ 608 along the X-axis. The distance (D) 610 between the centers of each lens (i.e., center of pinholes) is equal to the difference between $X_1$ 606 and $X_2$ 608. In this example, the optical axis of each camera is in the XZ plane and the XY plane is parallel to the image plane of both the left and right cameras 108, 110. Assume that the X axis is the baseline and the origin, O, of the coordinates system (X, Y, Z) of the image capture device 106 is located at the lens center (e.g., pinhole) of the left camera 108. The three dimensional coordinates of the point $P_1$ 602 can be determined from the following algorithms:

Define a scaling factor as:

$$S=D/|x1-x2| \qquad (3).$$

Then, the X, Y, Z coordinates can be determined as follows:

$$z=f*S \qquad (4);$$

$$X=x1*S \qquad (5); \text{ and}$$

$$Y=y1*S=y2*S \qquad (6).$$

Figure 6B:
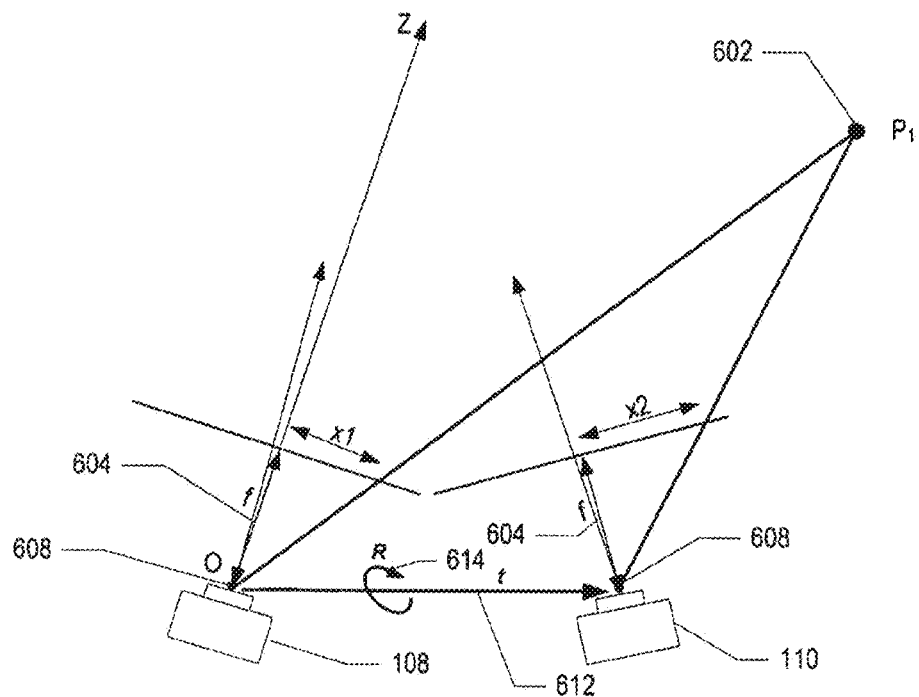

FIG. 6B depicts another epipolar triangulation model for determining the location of a point $P_1$ 602 in a coordinate system of the image capture device 106. The left camera 108 and the right camera 110 are each pinhole cameras angled with their optical axes toed in toward each other. For purposes of illustration assume that the left camera 108 and right camera 110 each have the same focal length F 604. The distance between the origins of each camera's pinhole model is represented by translation vector t. Any rotation, including the toe-in of the optical axes, can be represented by a rotation matrix R. A mapping of the left and right camera coordinate systems will bind projection vectors representing point P1 into one overall coordinate system. One such mapping is the essential matrix, E, resulting from the product of the skew-symmetric matrix of vector t, as indicated by reference character 612, and the rotation matrix R, as indicated by reference character 614. Projection vectors x1 and x2 are now related in a single coordinate frame as:

$$x1*E*x2=0 \qquad (7).$$

Coordinates (X, Y, and Z) of point $P_1$ are derived from simple triangulation of these projection vectors within the combined coordinate frame.

A cross measure module 328 calculates the distance between two or more stereo points defined by the stereo point module 326. In one example, the cross measure module 328 calculates the distance between two or more stereo points in response to a user selecting a measure control 446, such as shown in FIG. 4E. The UI module 320 displays the calculated distance in a measurement table 448.

A composite module 330 is configured to combine or stitch two stereo image pairs 310 into a composite stereo image pair 332. The composite stereo image pair 332 comprises two stereo image pairs 310 in which there is some overlap between the right and left images 116, 118 included in each of the two stereo image pairs 310. By combining two such stereo image pairs 310, measurements can be obtained between a first point in the left and right images 116, 118 of a first stereo image pair image and a second point in the left and right images 116, 118 of a second stereo image pair. In particular, measurement can be obtained between the non-overlapping portions of the right and left images 116, 118 included in the two stereo image pairs 310.

According to one aspect, the user 102 defines composite points in each of two stereo image pairs 310 and overlays the two stereo image pairs 310 based on the composite points to create the composite stereo image pair 332. For example, the users uses the point selection techniques described above to select the same three non-co-linear and uniquely identifiable reference points in both of the stereo image pairs 310. The composite module 330 overlays to the two stereo image pairs 310 such that the three non-co-linear and uniquely identifiable reference points match to create the composite stereo image pair 332 in response to the user 102 selecting a create composite control 450, such as shown in FIG. 4A. The composite stereo image pair 332 comprises a composite left image and a composite right image. The composite module 330 then stores the composite stereo image pair 332 in the memory 138.

Figure 7A:
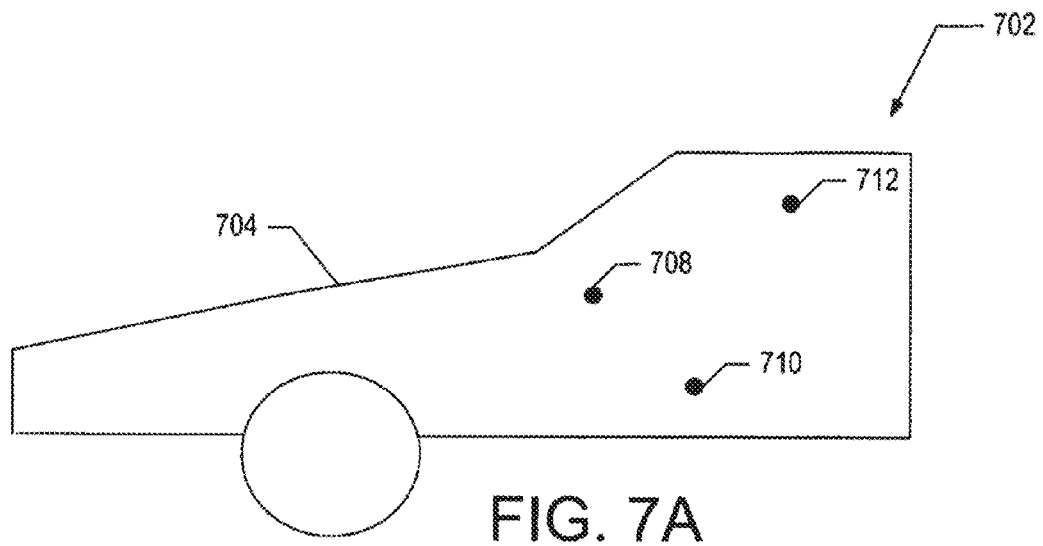
FIGS. 7A-7D are illustrations of an overlay process for creating a composite stereo image pair from two stereo image pairs.
Figure 7B:
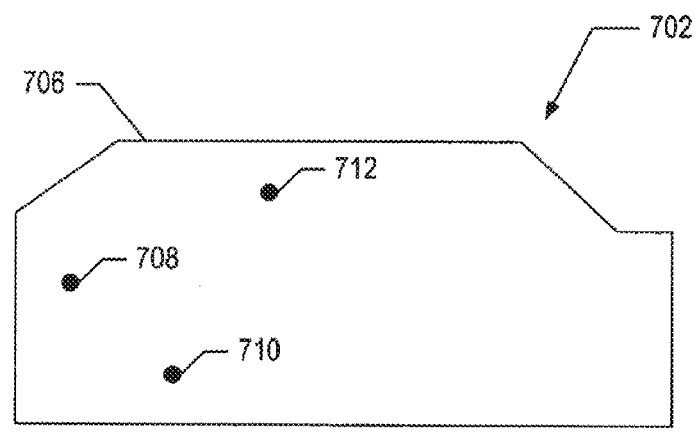
Figure 7C:
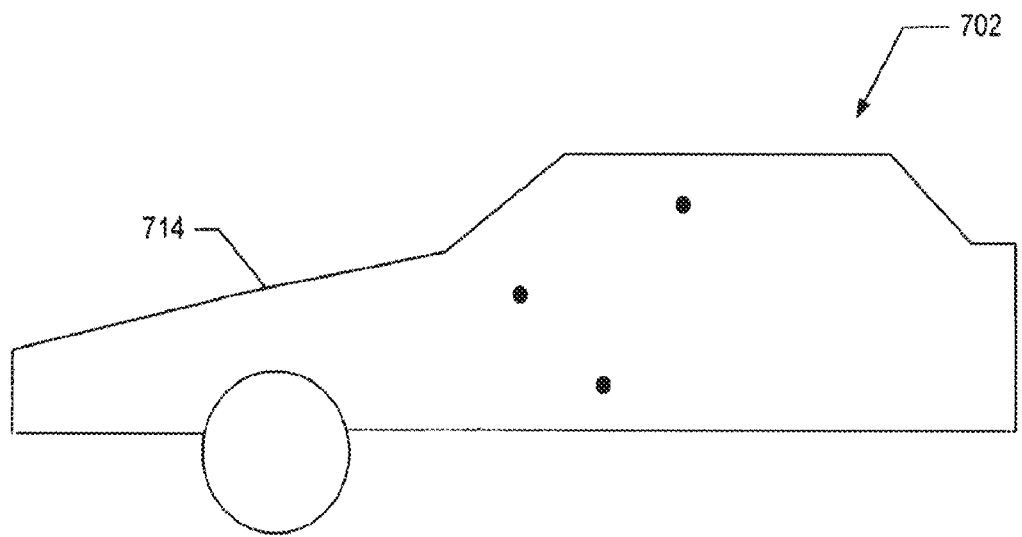

FIGS. 7A-7C depict an overlay process for creating a composite stereo image pair 332 based on two stereo images of a vehicle 702. Although the overlay process involves combining both left and right images from two stereo pairs, for purposes of illustration the overlay process is described in reference to combining the left images 116 of two stereo pairs 310. FIG. 7A depicts a first left image 704 of a first stereo image pair that corresponds to a front section of the vehicle 702.

FIG. 7B depicts a second left image 706 of a second stereo image pair 310 that corresponds to the mid section of the vehicle 702. As described above, the user 102 uses the point selection techniques described above to select the same three non-co-linear and uniquely identifiable reference points in both the first and second left images. In this example, reference points 708, 710, 712 are selected in both the first and second left images 704, 706.

Figure 7D:
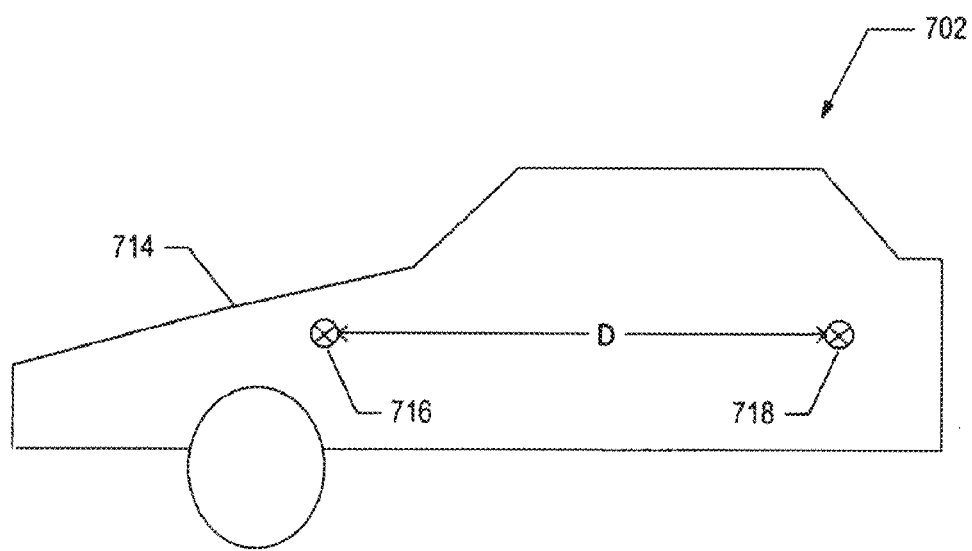

FIG. 7C depicts an overlay of the first left image pair 704 and second left image 706 such that reference points 708, 710, 712 match to create a composite left image 714. As shown in FIG. 7D, a first measurement point 716 can be selected in the front section of the vehicle 702 and a second measurement point 718 can be selected in the mid-section of the vehicle 702 via the composite left image 714.

Notably, a same overlay process is used to create a composite right image based on a first right image of the first stereo image pair the second right image of the second stereo image pair.

According to another aspect, the user 102 interacts with the image management form 322 to add the composite stereo image pair 332 to an existing project. For example, the user 102 uses the input device 136 to select, for example, the add control 420 (see FIG. 4C) to add the composite stereo image pair 332 to the existing project.

According to another aspect, the user 102 interacts with the image management form 322 to select a composite stereo image pair 332 to display the left images and right images 116, 118 of each stereo pair 310 included in the composite stereo image pair 332. In one example, the user 102 selects a composite stereo image pair 332 for viewing by using the input device 136 to enable or select a check box (not shown) adjacent to a desired composite stereo image pair 332. The UI module 320 displays images from the left and right images 116, 118 for each of the stereo images in image windows 452-458 in response to the user selecting the composite stereo image pair 332.

According to another aspect, the user 102 uses the input device 136 to select one of image windows 452-458 to display the corresponding image in the active window 430.

Referring back to FIG. 3A, the measurement application 302 is configured to retrieve information from a measurement database 334 that comprises stereo point data 336 for specific defined points on one or more objects 104. In one example, the measurement database 334 comprises stereo point data 336 for defined stereo points, or reference stereo points, along a vehicle body for a specific type of vehicle when the body is not damaged.

By comparing stereo point data from the measurement database 334 to stereo points generated based on user-designated points in stereo images of a vehicle of the same type with body damage, a precise assessment of the amount of damage to the vehicle can be determined. For example, the location of a reference stereo point on an undamaged vehicle can be compared to stereo points defined based on corresponding user-designated points in stereo images of a damaged vehicle. The distance between the reference stereo point and one or more defined stereo points can be measured to determine an amount of damage to the vehicle.

As another example, by comparing stereo point data 336 from the measurement database 334 to stereo points generated based on user-designated points in stereo images of an undamaged vehicle, deviations in the body of the undamaged vehicle can be identified. As a result, the measurement system 100 can be used to verify that products, such as vehicles, are being manufactured within desired tolerances. Although the measurement database 334 is depicted as being external the processing system 120, it is contemplated that the measurement database 334 may be located on the processing system.

In one embodiment, the processing system is configurable to designate measurement points on a part of the vehicle on one side of the vehicle. The processing system is further configurable to designate corresponding measurement points on a corresponding part of the vehicle on the other side of the vehicle. In the example of FIG. 17, two measurement points are designated on a wheel on one side of the vehicle, and corresponding points are designated on a wheel on the other side. The designation in the example of FIG. 17 is performed on one stereo image pair. The processing system is configurable to define stereo points based on the measurement points, and to calculate the distance between the defined stereo points on opposite sides. In the example of FIG. 17, the processing system is configurable to quickly and accurately permit a determination of whether there is damage to the axle.

A symmetry module 338 is configured to determine if there are symmetry deviations between selected points on an object. According to one aspect, using the techniques described above, the user 102 opens a new project or an existing project that comprises at least two stereo image pairs that show opposing sides of an object. The user 102 then uses the point selection techniques described above to define a set of stereo points on each opposing side of the object 104.

Figure 4F:
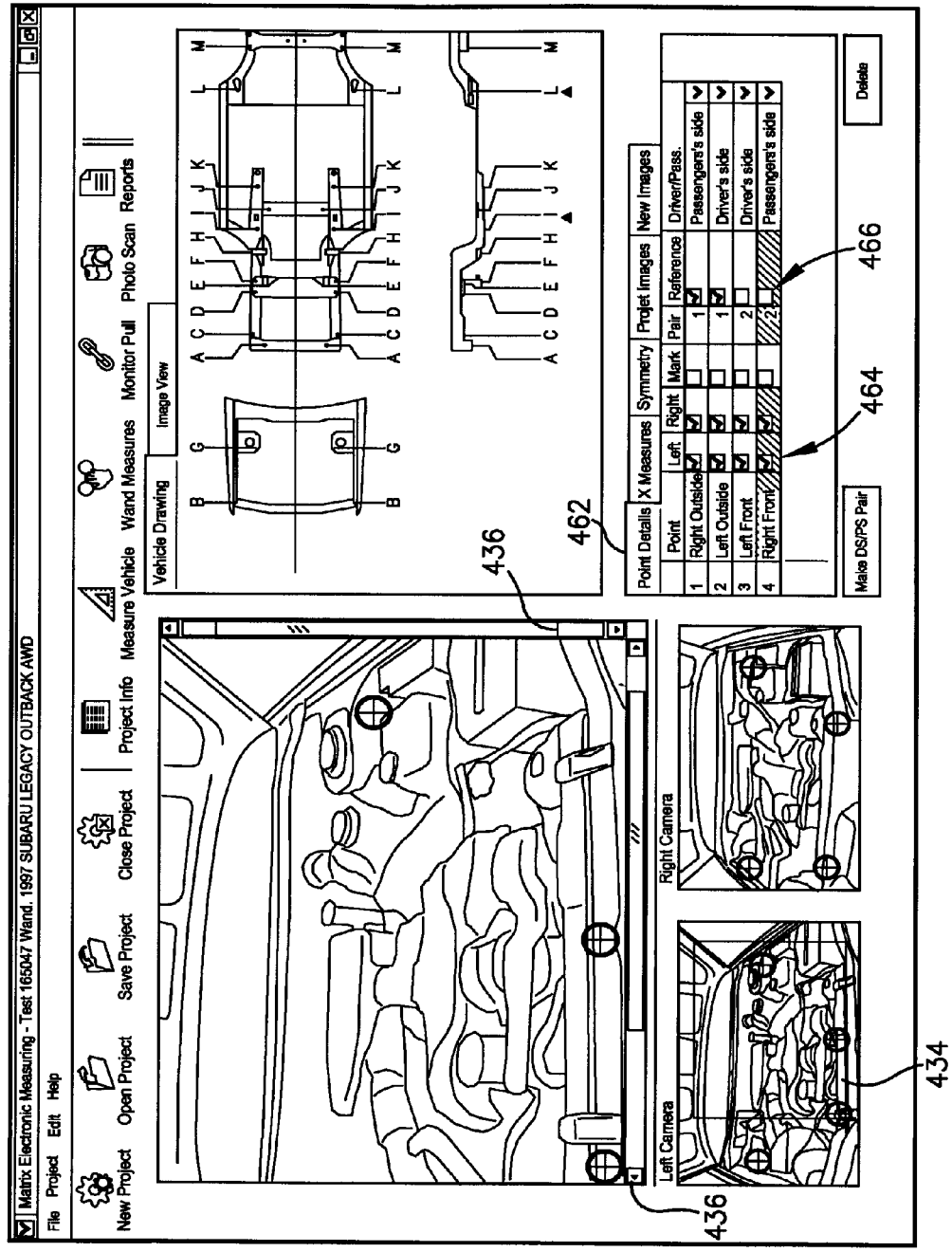

For example, if the object 104 is a vehicle, the user 102 selects a set of points (e.g., first and second points) in a first stereo image pair 310 comprising left and right images 116, 118 of a passenger side of the vehicle. The user 102 then selects another set of points (e.g., first and second points) in a second stereo image pair 310 comprising left and right images 116, 118 of a driver side of the vehicle. The user interacts with the image management form 322 to define point details for a selected set of points. For example, the user 102 uses the input device 136 to select, for example, a point detail control 462 to display a point detail table 464, such as depicted in FIG. 4F. The user 102 then designates one set of points as a reference set by using the input device 136 to enable an adjacent check box control 466.

Figure 3E:
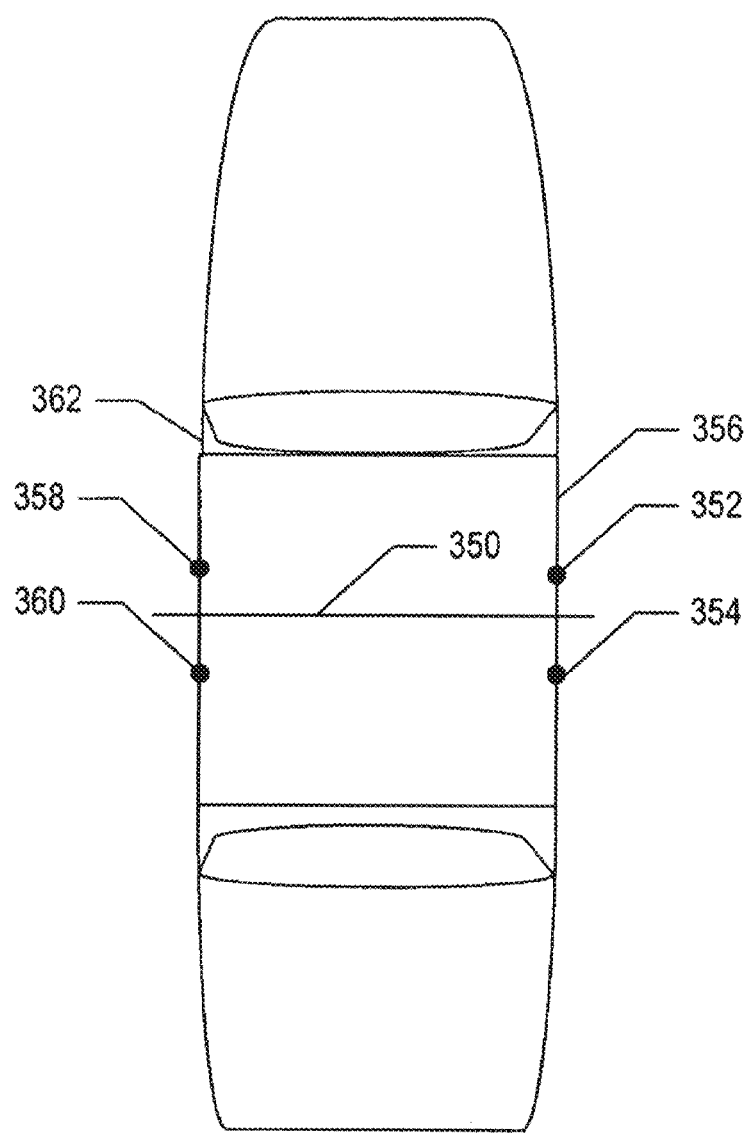
FIG. 3E is an image of a vehicle with a central reference plane between selected points.

According to one aspect, the symmetry module 338 is configured to define a central reference plane 350 based on the designated reference set in response to the user selecting a symmetry control 468, such as depicted in FIG. 4C. As an example, FIG. 3E depicts a top view of a vehicle having a first point 352 and a second point 354 selected on the passenger side 356 a corresponding first point 358 and a corresponding second point 360 point selected on a driver side 362. Assuming the user designates the first point 352 and second point 354 selected on the passenger side 356 as the reference set, the symmetry module 338 defines the central reference plane 350 between the first point 352 and the second point 354.

According to one aspect, symmetry deviations are determined and displayed as deviation values via the image management form. In one example, the determined deviation values are displayed as two values, one for distance from the center plane (Y) and one for the combined X and Z values.

Figure 3F:
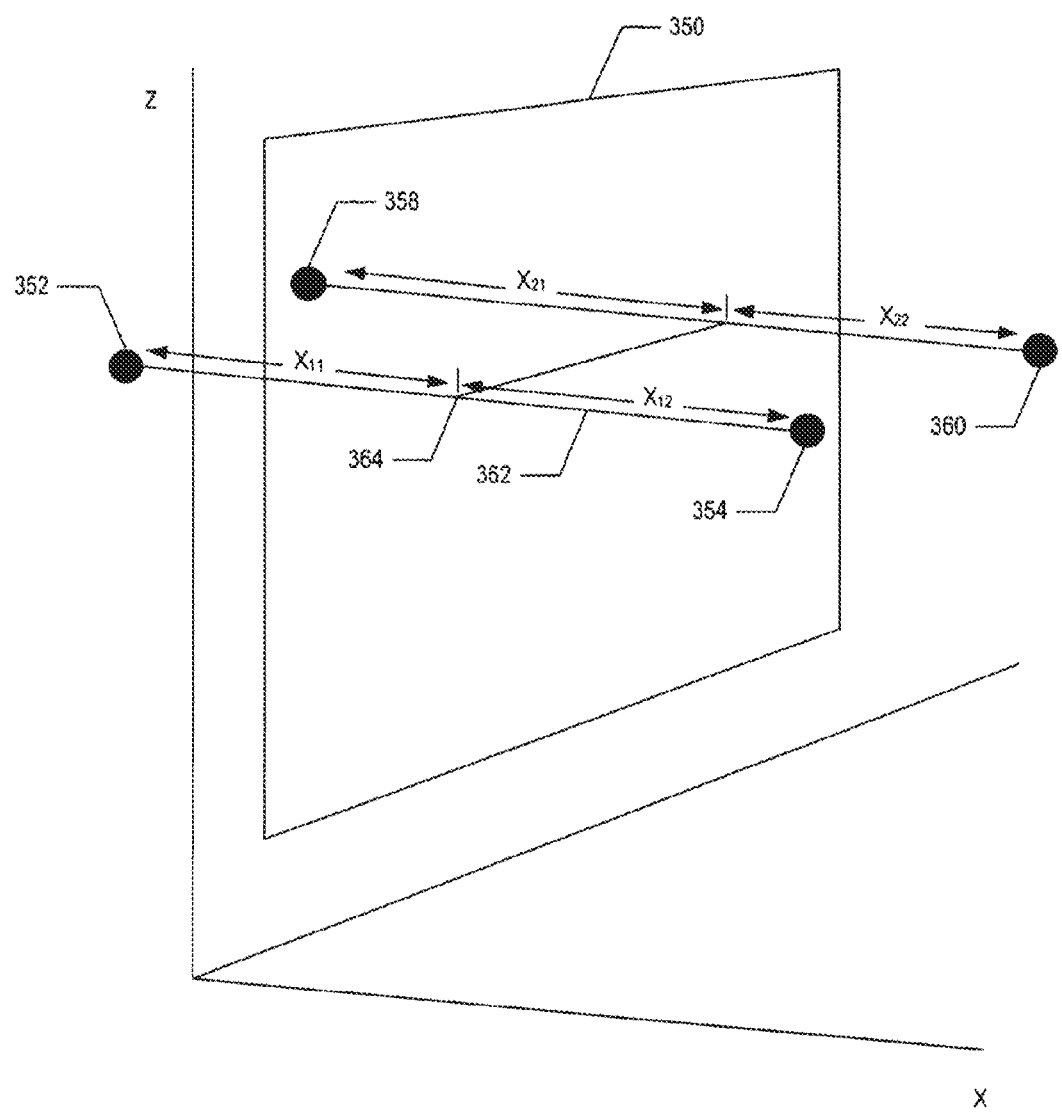
FIG. 3F is a geometric model for determining symmetry between selected points on an image.

FIG. 3F depicts a geometrical model for determining symmetry between a first set of points on a first side of an object and a second set of points on a second side. For purposes of illustration, the geometrical model will be described in reference to the example shown in FIG. 3E. A vector 362 is defined between the first and second points 352, 354 and a midpoint 364 of the vector 362 is determined. The center reference plane 350 is defined as the plane that passes though the midpoint 364 and that is perpendicular to the vector 362. The midpoint 364 is also defined as the origin of an X, Y, and Z coordinate system.

The distance $X_{11}$ from the first point 352 to a perpendicular point on the reference plane 350 is determined and the distance $X_{12}$ from the second point 354 to the perpendicular point on the reference plane 350 is determined. The distance $X_{21}$ from the corresponding first point 358 to a perpendicular point on the reference plane 350 is determined and the distance $X_{22}$ from the corresponding second point 360 to the perpendicular point on the reference plane 350 is determined. Corresponding distances are compared to determine symmetry deviation values. For example, distance $X_{11}$ is compared to distance $X_{21}$. According to one aspect, the measurement application 130 defines the difference in distances as the X deviation error. If neither point is a reference point, the measurement application 130 divides the X deviation error. If at least one point is a reference point, the measurement application 130 assigns the X deviation error to the non-reference point.

According to another aspect, the measurement application 130 determines the points at which the first point 352 and second point 354 projects into the reference plane 350, and determines the points at which the corresponding first point 358 and second point 360 projects into the reference plane 350. The measurement application 130 determines a combined YZ error of the first and second points 352, 354 as a function of the distance between the projected points from the passenger side 356. Similarly, the measurement application 130 determines the combined YZ error of the corresponding first and second points 358, 360 as a function of the distance between the projected points from the driver side 362. If neither point is a reference point, the measurement application 130 splits the YZ error. Otherwise, the measurement application 130 assigns the YZ error to the non-reference point.

Figure 19:
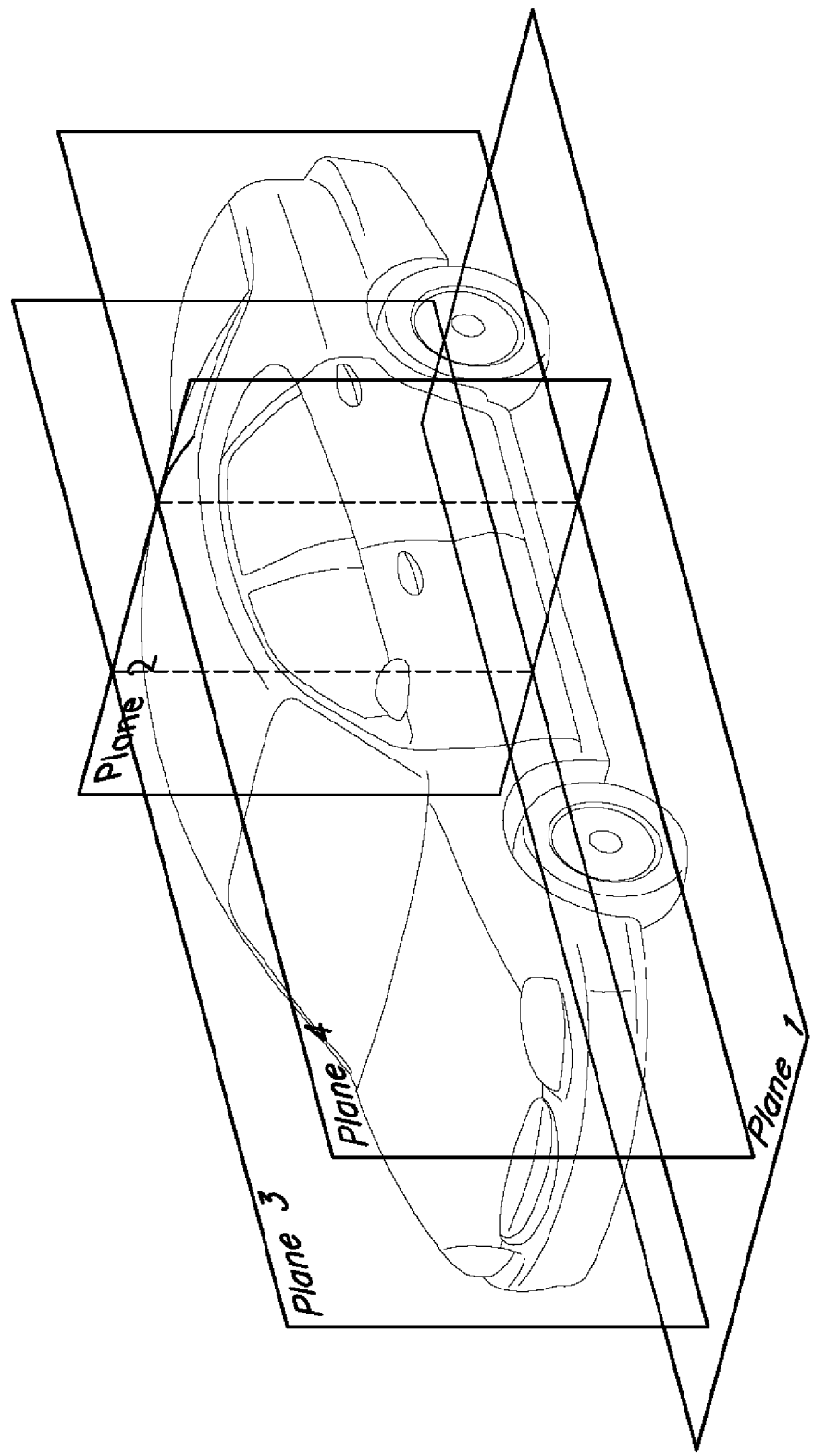
FIG. 19 is a diagram of reference planes.
Figure 20:
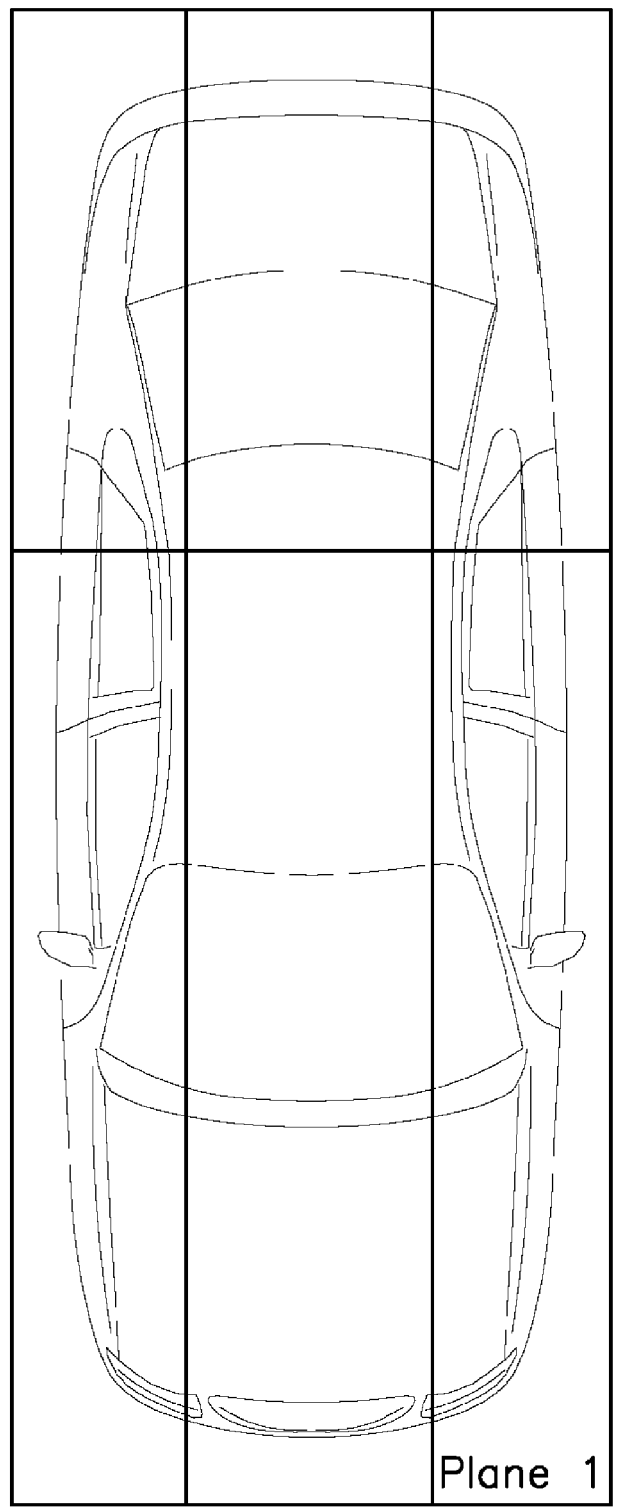
FIG. 20 is a diagram of reference planes.

In an embodiment, the stereoscopic measurement system 100 is configured to define reference planes in a Cartesian coordinate system. FIGS. 19 and 20. In one example, the processing system is configurable to define one or more reference planes based on at least three stereo points. In one aspect, the processing system is configurable to define three stereo points based on designation of three pairs of measurement points in a stereo image pair. In one embodiment, the three defined stereo points are located on undamaged portions of the object, and the processing system is configurable to define one or more reference planes based on the three stereo points. The processing system is configurable to define stereo points relative to one or more reference planes.

Figure 18:
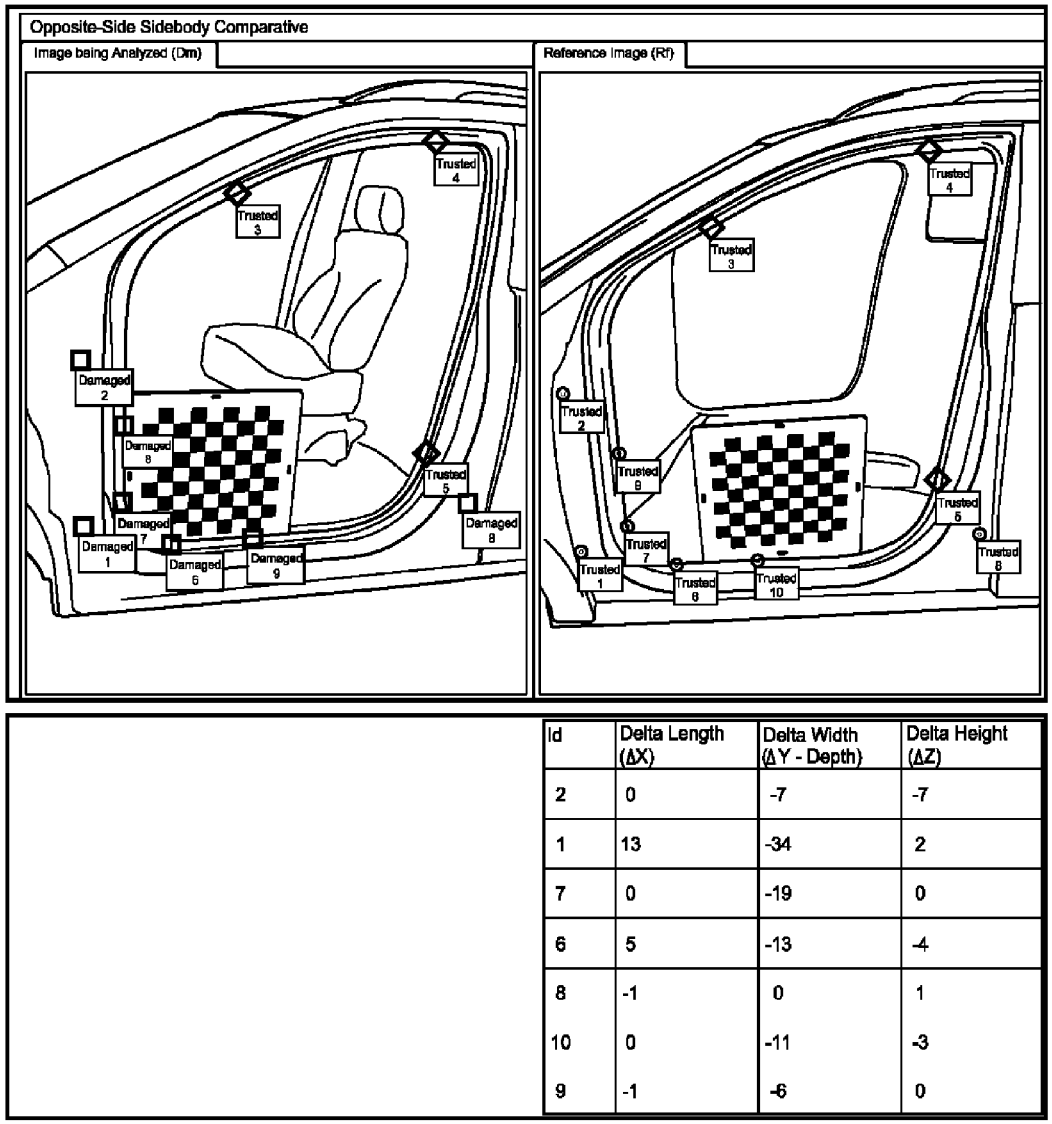
FIG. 18 is an illustration of measurements points on the door frames of a vehicle.

The processing system is further configurable to define the reference plane independently of the object, and to define the origin of the reference plane independently of the object. The reference plane may be defined arbitrarily, including being defined relative to 1) the center line of a vehicle, 2) a side of the vehicle opposite to the object, 3) the vehicle's under hood structure and components, 4) the vehicle's inner body, 5) the vehicle's rear body, 6) the vehicle's upper body, including roof and rear areas and other such identifiable objects, and 7) a location not on the vehicle. FIGS. 12-15 are illustrations of areas relative to which reference planes may be defined. The origin of the reference planes may be defined anywhere in the space, including at a location not on the object, and at a location proximal to a particular portion of the object, such as a damaged portion. The processing system is configurable to define the reference planes 1) substantially parallel to the ground, 2) at substantially right angles to the ground and parallel to a vehicle's direction of travel, 3) at substantially right angles to the ground and substantially right angles to the vehicle's direction of travel, and 4) anywhere in space. In an embodiment, the processing system is configurable to define reference planes for a part of the vehicle that is suspected to be damaged and to define reference planes for a corresponding part of the vehicle that is believed to be undamaged. In the example of FIG. 18, reference planes are defined for the door frame on the driver's side and on the passenger side. In FIGS. 19 and 20, the processing system is configurable to define reference planes that are orthogonal to each other. The processing system is further configurable to designate measurement points on damaged portions ("test" points), to designate reference measurement points on undamaged portions that correspond to the test points, and to determine deviations of such test points from the corresponding reference measurement points based on the reference planes.

In one aspect, the system utilizes a method for processing information about an object for retrieval. The information includes the object's identification—a vehicle, for example, may be identified by its year, make, model, and trim line. A specific vehicle can be identified by its vehicle identification number. A stereo image pair of the object is provided, and a Cartesian reference coordinate plane is defined. A stereo point in the stereo image pair is defined relative to the reference coordinate plane. The reference coordinate plane and the stereo point are associated with the object's identification. The stereo image pair may also be associated with the object's identification. The reference coordinate plane, the stereo point, the object's identification, and the associations are stored in a data repository. The stereo image pair and its association with the object may also be stored in the repository. The data repository may be local, remote, centralized, distributed, or virtualized. The measurement database 334 may function as the data repository. The object may include a vehicle, a vehicle part, and any other objects of interest. The object's identification may include its description, its part number, or any convenient way to identify the object. In the example of a vehicle, measurement information has previously been limited in scope to those measurements that the information provider had deemed important. The information provider could not predict what data points may be needed. The system and method permit the definition of any stereo point in the stereo image pair of the vehicle, thus, effectively permits an infinite number of data points. The stereo points are not limited to points on portion of the car that typically requires attention, but can also be any arbitrary point on the vehicle. Any stereo point in the stereo image pair can be defined relative to a reference coordinate plane. The distance between any two defined stereo points can be measured. New undamaged cars, used cars, and damaged cars may be imaged, thus providing measurements useful in various scenarios, including during repair of the car. Facilities such as car dealerships, car auctions, car manufacturers, and car repair shops collect the car's identification information and use the system 100 to capture the stereo image pair, and define the reference coordinate plane and the stereo point. The facility then stores the identification information, the stereo image pair, and the defined data into a repository. The repository may be a database hosted by a file server, located at either the facility, or a remote facility, such as a car manufacturer or a data center. Data is transferred, by transmission or otherwise, to the remote facility for storage. The data repository may be located on one or more servers in one location, or may be distributed among servers located in multiple locations. The data repository may be a virtual repository hosted in cloud storage without regard to the location of servers. The stored data may be accessed by facilities such as car repair shops, car manufacturers, or anyone who uses the information in the stored data. Access may require authorization, may be subscription-based, and may be limited in scope of accessible data. Provided access, the stored data may be searched for data that matches search terms. Data that matches, if any, will be provided as an output.

According to another aspect, a reporting module 340 creates customized reports. In one example, the reports include the results of the calculations of cross measures based on user-designated points. The results can be displayed in a tabular format on the image management form 334. In another example, the reports comprise deviations from symmetry or comparative measurements based on stereo point data retrieved from the measurement database 330. In another example, images and/or diagrams are incorporated into reports. For example, if the object 104 being analyzed is a vehicle, the reports may include images or diagrams 470 of the vehicle with measure points identified and labeled, such as depicted in FIG. 4E. Notably, reports can be generated for display and can optionally be printed and/or saved to disk.

According to another embodiment, the measurement application 130 is executed on a server computer, and reports and/or image data can be communicated to remote computers, such as personal computers, laptops, personal digital assistants, and any other computing device via a communication network, such as the Internet, an Intranet, or any other suitable communication network.

Computer readable media 370 may include volatile media, nonvolatile media, removable media and non-removable media, may also be any available medium that may be accessed by the general purpose computing device. By way of example and not limitation, computer readable media 370 may include computer storage media and communication media. Computer storage media may further include volatile, nonvolatile, removable, and non-removable media implemented in any method or technology for storage of information such as computer readable instructions, data structures, program modules, or other data. Communication media may typically embody computer readable instructions, data structures, program modules, or other data in a modulated data signal, such as a carrier wave or other transport mechanism and include any information delivery media. Those skilled in the art will be familiar with the modulated data signal, which may have one or more of characteristics set or changed in such a manner that permits information to be encoded in the signal. Wired media, such as a wired network or direct-wired connection, and wireless media, such as acoustic, radio frequency, infrared, and other wireless media contemplated by the stereoscopic measurement system 100, are examples of communication media discussed above. Combinations of any of the above media are also included within the scope of computer readable media discussed above.

Figure 8:
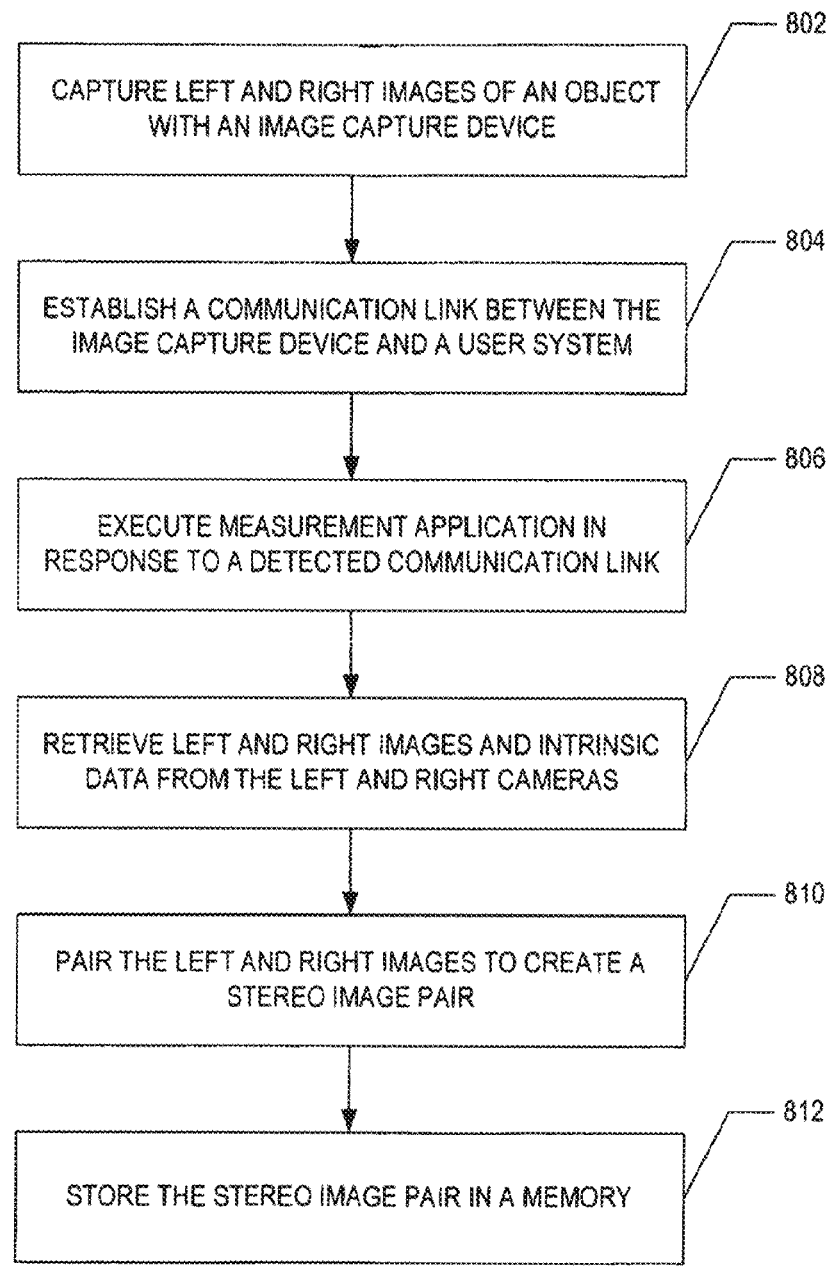
FIG. 8 is a flow chart illustrating a stereo image acquisition method according to one aspect of the stereoscopic measurement system.

FIG. 8 illustrates a stereo image acquisition method according to an aspect of the measurement system. At 802, the image capture device 106 captures the left image 116 and right image 118 of the object 104 via the left camera 108 and the right camera 110, respectively. A communication link is established between the processing system 120 and the image capture device 106 at 804. As described above, the communication link can be established via a wired connection 128 or the combination of a wireless transmitter 124 and wireless receiver 126.

At 806, the measurement application 130 is executed in response to the established communication link between the processing system 120 and the image capture device 106. The measurement application 130 retrieves the left and right images 116, 118 and downloads intrinsic data from the left and right cameras at 808. At 810, the measurement application 130 pairs the left image 116 and the right image 118 to create the stereo image pair 310. The measurement application 130 stores the stereo image pair 310 and corresponding download history data 312 in the memory 138 at 812. As described above, the download history data 312 comprises, for example, a time and date that the left image 116 and the right image 118 of the stereo image pair 310 were transferred from the image capture device 106 to the processing system 120.

Figure 9:
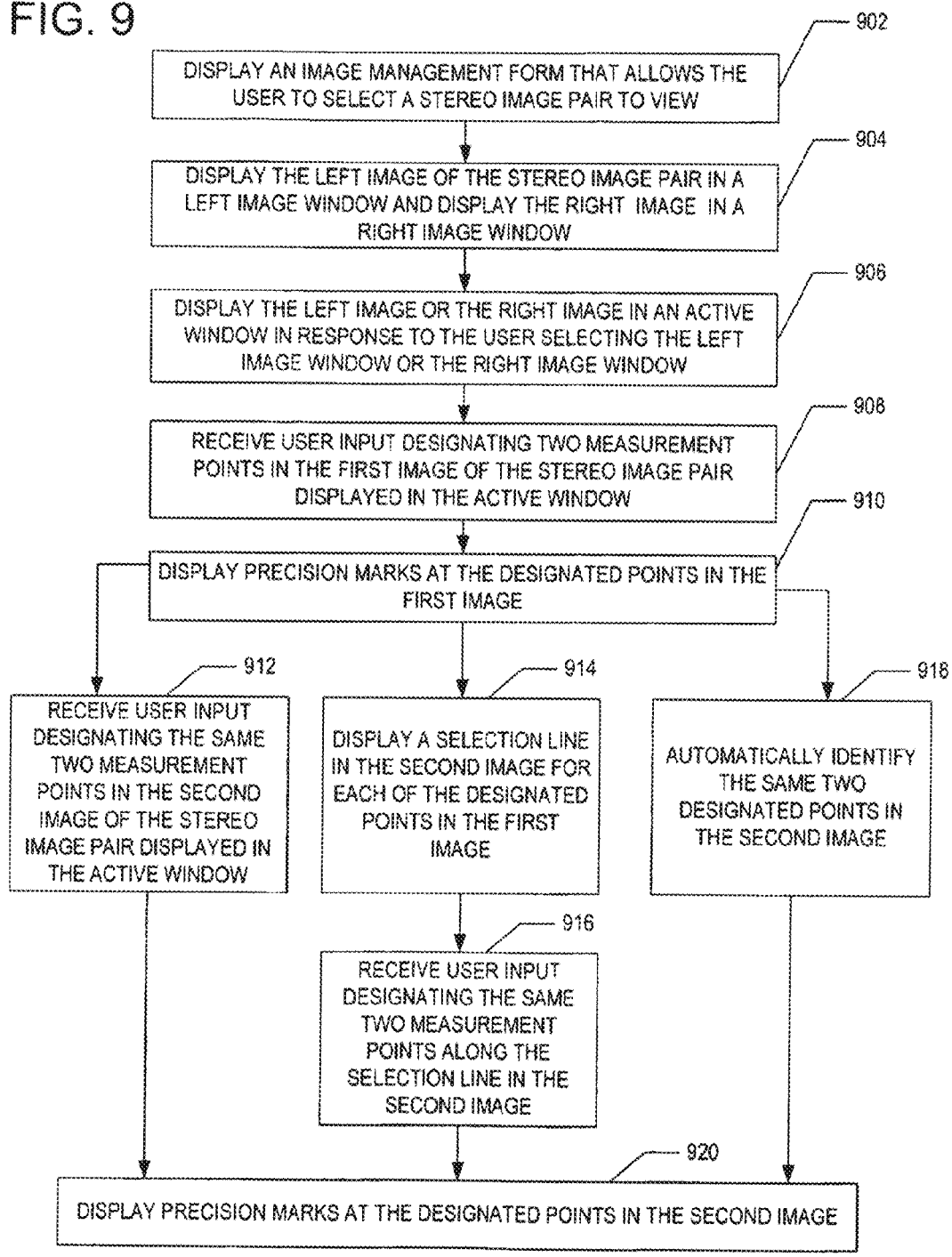
FIG. 9 is a flow chart illustrating a point measurement method within a stereo image pair according to one aspect of the stereoscopic measurement system.

FIG. 9 illustrates a point measurement method within a stereo image pair 310 according to one aspect of the measurement system 100. At 902, the measurement application 130 displays an image management form 322 on the display 134 that allows a user to select a stereo image pair 310 for viewing. The left image 116 and right image 118 of the selected stereo image pair 310 in the left image window 426 and the right image window 428 at 904. At 906, the left image 116 or the right image 118 is displayed in the active window 430 in response to the user 102 selecting the left image window 426 or the right image window 428. As described above, the user 102 uses the input device 136 to select the left image window 426 to display the left image 116 in the active window 430 or to select the right image window 428 to display the right image 118 in the active window 430.

At 908, the user 102 interacts with the image management form 322 to designate two measurement points within a first image of the stereo image pair that is displayed in the active window 430. For example, after the user 102 visually locates the desired point, the user 102 positions a mouse pointer over the desired location in the first image and clicks the mouse button to designate two measurement points in the first image. Precision marks (e.g., precision marks 438, 442) are displayed at the locations in the first image displayed in the active window 430 where the user designated the point at 910.

At 912, the user 102 interacts with the image management form 322 via the input device 136 to designate the same measurement points within the second image of the stereo image pair 310 displayed in the active window 430. Optionally at 914, the measurement application 130 displays a selection line that defines a range of possible matching points in the second image 116 based on each of the user designated points in the first image. At 916, the user 102 interacts with the image management form 322 to designate the same measurement points along the selection lines within the second image of the stereo image pair 310 displayed in the active window 430.

As another option, at step 918, the measurement application 130 automatically identifies points in the second image that corresponds to the points designated by the user in the first image. As describe above, in addition to generating selection lines 438 in the second image 116, the measurement application utilizes a pattern recognition algorithm to identify a point along the selection lines that correspond to the points designated by the user 102 in the first image. At 920, precision marks (e.g., precision marks 440, 444) are displayed at locations in the second image that correspond where the user 102 designated measurement points in the second image at 912 or 916, or where the measurement application 130 automatically identified the matching measuring points in the second image at 918.

Figure 10:
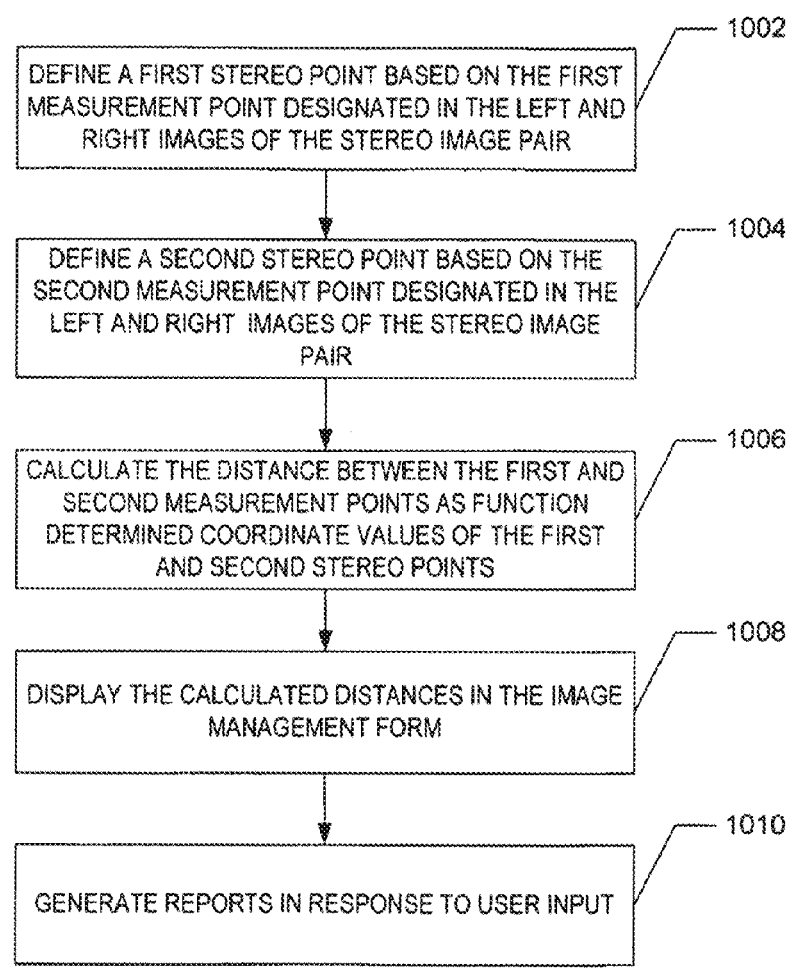
FIG. 10 is a flow chart illustrating a method for calculating and reporting measurements between designated measurement points in a stereo image pair according to one aspect of the stereoscopic measurement system.

FIG. 10 illustrates a method for calculating and reporting measurements between designated measurement points according to one aspect of the measurement system 100. At 1002, the measurement application 130 defines a first stereo point for the first measurement point designated in the left image 116 and the right image 118. The measurement application 130 defines a second stereo point for the second measurement point designated in the left image 116 and the right image 118 at 1004. As described above, each stereo point corresponds to the x, y, z coordinates of the common designated point in the left and right images 116, 118 as determined from triangulation. The distance between the first and second measurement points is calculated as function of the coordinate values of the first and second stereo points at step 1006. At step 1008, the calculated distances are displayed to the user via the image management form. At step 1010, the reports are generated in response to input received from a user via the image management form.

The systems and methods of the invention provide more efficient and accurate determinations of relative locations of objects. For example, the tolerance range of the relative locations of two parts of an item may be measured more efficiently and accurately. In another example, an efficient and accurate determination of a shift in a building's foundation can be performed. In vehicle collision repair, the repair shop may determine alignment quickly and accurately, thereby avoiding the expensive and time consuming back and forth transfer of the vehicle between the repair shop and the alignment facility, and enabling the repair and return of the vehicle in a shorter time to the vehicle's owner. The repair shop may easily document for insurance and other purposes the parts requiring repair on the images of the damaged portions of the actual vehicle being repaired.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

The invention claimed is:

1. A system for determining the wheel alignment for a vehicle, the system comprising:
   an object, wherein the object is a part of the vehicle,
   an image capture device for capturing a first image of the object and a second image of the object;
   a stereo image pair comprising the first and second images;
   a processing system comprising a memory, wherein the processing system is configured to:
      store the stereo image pair in the memory;
      designate a first measurement point in the first image;
      designate a second measurement point in the first image;
      designate the first measurement point in the second image;
      designate the second measurement point in the second image;
      define a first stereo point of the stereo image pair based on the first measurement point;
      define a second stereo point of the stereo image pair based on the second measurement point; and
      calculate the distance between the first stereo point and the second stereo point;
   a test portion of the object;
   a reference portion of the object, the reference portion corresponding to the test portion;
   a second stereo image pair comprising a first reference image of the object and a second reference image of the object; and
   wherein the stereo image pair comprises images of the test portion of the object, and the second stereo image pair comprises images of the reference portion of the object.

2. The system of claim 1 wherein the processing system is further configured to receive user inputs to designate the first measurement point and the second measurement point in the first image.

3. The system of claim 2 wherein the processing system is further configured to receive user inputs to designate the first measurement point and the second measurement point in the second image.

4. The system of claim 1 wherein the processing system is further configured to receive:
   a first user input designating the first measurement point in the first image; then,
   a second user input designating the first measurement point in the second image; then,
   a third user input designating the second measurement point in the first image; then,
   a fourth user input designating the second measurement point in the second image.

5. The system of claim 1 wherein the first and second measurement points are located on the test portion, the system further comprising:
   a reference portion of the object, the reference portion corresponding to the test portion;
   wherein the processing system is further configured to:
      designate the first measurement point and the second measurement point on the reference portion;
      calculate the distance between the first measurement point on the test portion and the first measurement point on the reference portion; and
      calculate the distance between the second measurement point on the test portion and the second measurement point on the reference portion.

6. The system of claim 5 wherein the test portion is on an opposite side of the vehicle from the reference portion.

7. The system of claim 1 wherein a first side of the object comprises the reference portion and a second side of the object comprises the test portion.

8. The system of claim 1 wherein the processing system is further configured to define a reference plane, the plane separating the reference portion from the test portion.

9. The system of claim 8 wherein the reference plane is a central reference plane.

10. The system of claim 8 further comprising:
a damaged portion of the object located on the test portion;
a first reference point on the reference portion of the object;
a second reference point on the test portion of the object, wherein the second reference point is not located on the damaged portion, and the second reference point corresponds to the first reference point; and
wherein the distance between any given point on the reference plane and the first reference point is equal to the distance between the given point on the reference plane and the second reference point.

11. A system for determining the wheel alignment for a vehicle, the system comprising:
an object, wherein the object is a part of the vehicle,
an image capture device for capturing a first image of the object and a second image of the object;
a stereo image pair comprising the first and second images;
a processing system comprising a memory, wherein the processing system is configured to:
store the stereo image pair in the memory;
designate a first measurement point in the first image;
designate a second measurement point in the first image;
designate the first measurement point in the second image;
designate the second measurement point in the second image;
define a first stereo point of the stereo image pair based on the first measurement point;
define a second stereo point of the stereo image pair based on the second measurement point; and
calculate the distance between the first stereo point and the second stereo point;
wherein the object is damaged, the system further comprising:
an object, wherein the object is a part of the vehicle,
an image capture device for capturing a first image of the object and a second image of the object;
a stereo image pair comprising the first and second images;
a processing system comprising a memory, wherein the processing system is configured to:
store the stereo image pair in the memory;
designate a first measurement point in the first image;
designate a second measurement point in the first image;
designate the first measurement point in the second image;
designate the second measurement point in the second image;
define a first stereo point of the stereo image pair based on the first measurement point; and
define a second stereo point of the stereo image pair based on the second measurement point; and calculate the distance between the first stereo point and the second stereo point;
a second object, wherein the second object corresponds to the object, and is undamaged;
a first image of the second object;
a second image of the second object; and
a second stereo image pair comprising the first and second images of the second object.

12. The system of claim 11 wherein the second object is part of the vehicle.

13. The system of claim 11 wherein the second object is part of another vehicle.

14. The system of claim 11 wherein the processing system is further configured to:
designate a third measurement point in the first image of the object;
designate the third measurement point in the second image of the object;
define a third stereo point of the stereo image pair based on the third measurement point;
designate the first measurement point, the second measurement point, and the third measurement point in the first image of the second object;
designate the first measurement point, the second measurement point, and the third measurement point in the second image of the second object; and
define three stereo points of the second stereo image pair based on the three designated measurement points of the second object.

15. The system of claim 14 wherein the processing system is further configured to:
define reference planes based on the three defined stereo points of the stereo image pair; and
define reference planes based on the three defined stereo points of the second stereo image pair.

16. The system of claim 15 wherein:
the three defined stereo points of the stereo image pair are reference stereo points; and
the three defined stereo points of the second stereo image pair are reference stereo points.

17. The system of claim 14 wherein the processing system is further configured to:
define a reference plane of the stereo image pair based on the three defined stereo points of the stereo image pair;
define a reference plane of the second stereo image pair based on the three defined stereo points of the second stereo image pair;
designate a fourth measurement point in the first image of the object;
designate the fourth measurement point in the second image of the object;
designate the fourth measurement point in the first image of the second object;
designate the fourth measurement point in the second image of the second object; and
wherein the fourth measurement point of the object is a test point and the fourth measurement point of the second object is a reference point.

18. The system of claim 17 wherein the processing system is further configured to determine a deviation between the test point and the reference point based on the reference planes.

19. The system of claim 17 wherein the reference planes are substantially parallel to the vehicle's direction of travel, and are at substantially right angles with the ground.

20. The system of claim 17 wherein the reference planes are substantially parallel to the vehicle's direction of travel, and are substantially parallel to the ground.

21. The system of claim 17 wherein the reference planes are at substantially right angles with the vehicle's direction of travel, and are at substantially right angles to the ground.

22. The system of claim 17 wherein the processing system is further configured to:
define a second reference plane of the stereo image pair based on the three defined stereo points of the stereo image pair;
define a second reference plane of the second stereo image pair based on the three defined stereo points of the second stereo image pair;
define a third reference plane of the stereo image pair based on the three defined stereo points of the stereo image pair;
define a third reference plane of the second stereo image pair based on the three defined stereo points of the second stereo image pair;
wherein the three reference planes of the stereo image pair are orthogonal to each other; and
wherein the three reference planes of the second stereo image pair are orthogonal to each other.

23. The system of claim 11 wherein the processing system is further configured to:
designate the first measurement point in the first image of the second object;
designate the second measurement point in the first image of the second object;
designate the first measurement point in the second image of the second object;
designate the second measurement point in the second image of the second object;
define a third stereo point of the second stereo pair based on the designated first measurement point;
define a fourth stereo point of the second stereo pair based on the designated second measurement point; and
calculate the distance between the third stereo point and the fourth stereo point.

24. The system of claim 11 wherein the second object is on a side of the vehicle opposite to the object.

25. The system of claim 11 wherein the second object is considered to be a reflection of the object.

26. The system of claim 1 wherein the object is selected from a group consisting of: 1) a wheel and suspension subsystem of the vehicle, 2) an engine cradle of the vehicle, 3) a lower control arm of the vehicle, 4) a unibody structure of the vehicle, 5) lower rails of the vehicle, 6) rear toe of the vehicle, 7) rear thrust angle of the vehicle, and 8) rear cradle of the vehicle.

27. The system of claim 1 wherein the first measurement point is selected from a group consisting of the vehicle's rocker panel, spindle, rotor, knuckle, and strut.

28. The system of claim 7 wherein the processing system is further configured to:
designate a first reference measurement point in the first reference image, the first reference measurement point corresponding to the first measurement point;
designate a second reference measurement point in the first reference image, the second reference measurement point corresponding to the second measurement point;
designate the first reference measurement point in the second reference image;
designate the second reference measurement point in the second reference image;
define a first reference stereo point corresponding to the first reference measurement point;
define a second reference stereo point corresponding to the second reference measurement point;
define a reference plane separating the first side of the object from the second side of the object; and
calculate symmetry deviations between the first and second stereo points and the first and second reference stereo points as a function of the defined reference plane.

29. The system of claim 1 wherein the processing system is further configured to create a customized report comprising the calculated distance between the first stereo point and the second stereo point.

30. The system of claim 1 wherein the processing system is further configured to:
compare the stereo points with known reference points for the object; and
determine the measurements between the stereo points and the known reference points.

31. The system of claim 29 wherein the processing system is further configured to:
define a reference stereo point on the object;
calculate a second distance between the first stereo point and the reference stereo point;
calculate a third distance between the second stereo point and the reference stereo point;
store reference stereo point data corresponding to the reference stereo point on the object; and
wherein the customized report further comprises the second calculated distance and the third calculated distance.

32. The system of claim 31 wherein the processing system is further configured to:
define a Cartesian reference coordinate space based on the first stereo point, the second stereo point, and the reference point;
define an origin for the reference coordinate space; and
wherein the customized report further comprises the first stereo point, the second stereo point, and the reference stereo point, wherein each calculated distance is reported relative to the reference coordinate space.

33. The system of claim 32 wherein the processing system is further configured to define the reference coordinate space independently of the object.

34. The system of claim 33 wherein the processing system is further configured to define the origin of the reference coordinate space independently of the object.

35. The system of claim 32 wherein:
at least one of the points is located on a vehicle; and
the defined reference coordinate space is selected from the group consisting of: 1) center line, 2) opposite side, 3) under hood, 4) inner body, 5) under body, and 6) rear body.

36. The system of claim 33 wherein the processing system is further configured to designate an origin not located on the object.

37. The system of claim 32 further comprising a damaged portion of the object, wherein the processing system is further configured to define an origin of the reference coordinate space wherein the origin is proximal to the damaged portion.

38. The system of claim 37 further comprising a first side of the object and a second side of the object, the first side comprising an undamaged portion and the second side comprising the damaged portion, wherein:
the second side is opposite to the first side;
the first stereo point is on the first side;
the second stereo point is on the second side, and is not on the damaged portion;
the first stereo point corresponds to the second stereo point;
the reference stereo point is on the first side;
the processing system is further configured to:
define a third stereo point on the damaged portion, wherein the third stereo point corresponds to the reference point; and
determine a deviation of the third stereo point.

39. The system of claim 1 wherein the processing system is further configured to generate a list of stereo image pairs for display, and to generate the first and second images of a selected one of the list of stereo image pairs for display.

40. The system of claim 1 wherein the processing system is further configured to generate a first selection assist line in the second image based the first measurement point, and to generate a second selection assist line in the second image based on the second measurement point.

41. The system of claim 40 wherein the processing system is further configured to identify a range of points in the second image based on the first measurement point to generate the first selection assist line, and to identify another range of points in the second image based on the second measurement point to generate the second selection assist line.

42. The system of claim 40 wherein the processing system is further configured to designate the first measurement point along the first selection assist line in the second image.

43. The system of claim 42 wherein the processing system is further configured to designate the second measurement point along the second selection assist line in the second image.

44. The system of claim 1 wherein the image capture device comprises a first camera to capture the first image and a second camera to capture the second image.

45. The system of claim 44 wherein a calibration pattern is captured together with each of the first image and the second image.

46. The system of claim 44 wherein the processing system is further configured to store download history data for the stereo image pair in the memory, the download history data comprising metadata and intrinsic calibration data for each of the first and second cameras and a time and date that the first and second images of the stereo image pair were received from the image capture device.

47. The system of claim 44 further comprising a monitor to display the first and the second images of the object, wherein the image capture device further comprises a switch to control the first camera and second camera to capture the first and second images of the object simultaneously.

48. A system for determining the wheel alignment for a vehicle, the system comprising:
an object, wherein the object is a part of the vehicle,
an image capture device for capturing a first image of the object and a second image of the object;
a stereo image pair comprising the first and second images;
a processing system comprising a memory, wherein the processing system is configured to:
store the stereo image pair in the memory;
designate a first measurement point in the first image;
designate a second measurement point in the first image;
designate the first measurement point in the second image;
designate the second measurement point in the second image;
define a first stereo point of the stereo image pair based on the first measurement point;
define a second stereo point of the stereo image pair based on the second measurement point; and
calculate the distance between the first stereo point and the second stereo point;
wherein the image capture device comprises a first camera to capture the first image and a second camera to capture the second image;
wherein the processing system is further configured to:
process the stereo image pair stored in the memory to determine if the first and second images of the object are images of a calibration pattern; and
determine stereo calibration data for the image capture device when the first and second images of the object are of the calibration pattern, the stereo calibration data comprising location information for the first camera relative to the second camera in a Cartesian coordinate space of the image capture device, and wherein the processing system is configured to store the stereo calibration data in the memory.

49. The system of claim 48 wherein the processing system is further configured to:
associate the stereo calibration data with the stereo image pair based on the download history data for the stereo image pair when the first and second images of the stereo image pair are not of the calibration pattern.

50. The system of claim 1 wherein the image capture device transmits the first and second images via a communication link selected from a group consisting of a wired connection and a wireless communication link.

51. A system for determining a deviation from a desired location of an object, the system comprising:
an image capture device to capture simultaneously a first image of the object, and a second image of the object, and a calibration pattern;
a processing system comprising a memory, wherein the processing system is configured to:
store in the memory a stereo image pair comprising the first and second images;
designate a plurality of measurement points in the first image;
designate the plurality of measurement points in the second image; and
define a plurality of stereo points based on the plurality of measurement points;
wherein the object further comprises a damaged portion;
wherein the image capture device further captures a second pair of first and second images of the object, the second pair of images comprising images of a corresponding undamaged portion of the object; and
wherein the undamaged portion of the object is considered to be a reflection across a plane separating the undamaged portion from the damaged portion of the object.

52. The system of claim 51 further comprising at least one reference stereo point on the object, wherein the processing system is further configured to store reference stereo point data corresponding to the at least one reference stereo point.

53. The system of claim 52 wherein the processing system is further configured to identify the deviation based on the plurality of defined stereo points and the reference stereo point data.

54. The system of claim 51 wherein the object is a part of a vehicle.

55. The system of claim 54 wherein the object is a component of a subsystem of the vehicle, the subsystem selected from a group consisting of the vehicle's 1) suspension subsystem, 2) steering subsystem, and 3) wheel alignment subsystem.

56. The system of claim 54 wherein the object is selected from a group consisting of: 1) a wheel and suspension subsystem of the vehicle, 2) an engine cradle of the vehicle, 3) a lower control arm of the vehicle, 4) a unibody structure of the vehicle, 5) lower rails of the vehicle, 6) rear toe of the vehicle, 7) rear thrust angle of the vehicle, and 8) rear cradle of the vehicle.

57. The system of claim 54 wherein the plurality of measurement points is located on objects selected from the group consisting of the vehicle's rocker panel, spindle, rotor, knuckle, and strut.

58. A system for determining a deviation from a desired location of an object, the system comprising:
an image capture device to capture simultaneously a first image of the object, and a second image of the object, and a calibration pattern;
a processing system comprising a memory, wherein the processing system is configured to:
store in the memory a stereo image pair comprising the first and second images;
designate a plurality of measurement points in the first image;
designate the plurality of measurement points in the second image; and
define a plurality of stereo points based on the plurality of measurement points;
wherein the object further comprises a damaged portion; and
wherein the image capture device further captures a second stereo pair, the second stereo pair comprising a first reference image and a second reference image of a corresponding undamaged portion of a second object, the second object corresponding to the object.

59. The system of claim 58 wherein the second object is considered to be a reflection across a plane separating the second object from the object.

60. The system of claim 51 wherein the processing system is further configured to:
identify a range of points in the second image based on at least one of the plurality of measurement points to generate a first selection assist line in the first image; and
identify another range of points in the second image based on at least another of the plurality of measurement points to generate a second selection assist line in the second image.

61. The system of claim 51 wherein the processing system is further configured to:
calculate a distance between any two defined stereo points; and
create a customized report comprising the calculated distance.

62. The system of claim 61 wherein the processing system is further configured to:
store reference stereo point data corresponding to a reference stereo point on the object, wherein the customized report further comprises at least one calculated distance between at least one of the stereo points and the reference stereo point.

63. A method for determining the relative position of a point on an object, the method comprising:
capturing a first image of the object, and a second image of the object;
storing first and second images as a stereo image pair in a memory of a processing system;
designating a first measurement point in the first image;
designating a second measurement point in the first image;
designating the first measurement point in the second image;
designating the second measurement point in the second image;
defining a first stereo point that corresponds to the first measurement point;
defining a second stereo point that corresponds to the second measurement;
calculating the distance between the first stereo point and the second stereo point;
wherein the first and second images comprise images of a damaged portion of the object;
capturing a second pair of first and second images of the object at the image capture device, wherein the second pair of images comprise images of an undamaged portion of the object;
defining a central plane separating the undamaged portion from the damaged portion of the object into a first side and a second side of the object, wherein the undamaged portion is located in the first side, and the damaged portion is located in the second side;
designating a first reference point on the first side of the object;
designating a second reference point on the second half of the object, wherein the second reference point is not located on the damaged portion, and the second reference point corresponds to the first reference point; and
wherein the distance between any point on the defined plane and the first reference point is equal to the distance between the point on the defined plane and the second reference point.

64. The method of claim 63 further comprising:
comparing the stereo points with reference stereo points of the object; and
determining the measurements between the stereo points and the reference stereo points.

65. A method for determining the relative position of a point on an object, the method comprising:
capturing a first image of the object, and a second image of the object;
storing first and second images as a stereo image pair in a memory of a processing system;
designating a first measurement point in the first image;
designating a second measurement point in the first image;
designating the first measurement point in the second image;
designating the second measurement point in the second image;
defining a first stereo point that corresponds to the first measurement point;
defining a second stereo point that corresponds to the second measurement;
calculating the distance between the first stereo point and the second stereo point;

wherein the first and second images comprise images of a damaged portion of the object; and capturing a reference pair of images, the reference pair comprising a first reference image and second reference image of a second object at the image capture device, wherein the reference pair of images comprise an undamaged portion of the second object, the undamaged portion corresponding to the damaged portion of the object.

66. The method of claim 65 wherein the second object is considered to be a reflection across a plane separating the second object from the object.

* * * * *